US012216719B2

(12) United States Patent
Benchetrit

(10) Patent No.: US 12,216,719 B2
(45) Date of Patent: Feb. 4, 2025

(54) DYNAMIC ADJUSTMENT OF PROFILE FEED IN A SOCIAL NETWORK

(71) Applicant: Bumble IP Holdco LLC, Wilmington, DE (US)

(72) Inventor: Ronen Benchetrit, London (GB)

(73) Assignee: Bumble IP Holdco LLC, Wilmington, DE (US)

( * ) Notice: Subject to any disclaimer, the term of this patent is extended or adjusted under 35 U.S.C. 154(b) by 0 days.

(21) Appl. No.: 18/079,580

(22) Filed: Dec. 12, 2022

(65) Prior Publication Data

US 2023/0195810 A1 Jun. 22, 2023

Related U.S. Application Data

(60) Provisional application No. 63/290,988, filed on Dec. 17, 2021.

(51) Int. Cl.
*G06F 16/9535* (2019.01)
*G06F 16/9538* (2019.01)
*G06Q 50/00* (2012.01)

(52) U.S. Cl.
CPC ...... *G06F 16/9535* (2019.01); *G06F 16/9538* (2019.01); *G06Q 50/01* (2013.01)

(58) Field of Classification Search
CPC .................................................. G06F 16/9535
See application file for complete search history.

(56) References Cited

U.S. PATENT DOCUMENTS

| 7,155,248 | B2 | 12/2006 | Idnani |
| 7,328,190 | B2 | 2/2008 | Smith et al. |
| 7,403,796 | B2 | 7/2008 | Silverbrook et al. |
| 7,630,926 | B2 | 12/2009 | Chakiris et al. |
| 7,657,100 | B2 | 2/2010 | Gokturk et al. |
| 7,657,126 | B2 | 2/2010 | Gokturk et al. |
| 7,660,468 | B2 | 2/2010 | Gokturk et al. |
| 7,693,907 | B1 | 4/2010 | Lee et al. |
| 7,707,122 | B2 | 4/2010 | Hull et al. |
| 7,882,039 | B2 | 2/2011 | Weiss et al. |
| 7,999,728 | B2 | 8/2011 | Chen et al. |

(Continued)

OTHER PUBLICATIONS

International Search Report and Written Opinion in International Appln. PCT/IB2022/062399, mailed Feb. 13, 2023, 14 pages.

*Primary Examiner* — Van H Oberly

(74) *Attorney, Agent, or Firm* — Fish & Richardson P.C.

(57) ABSTRACT

Methods, systems, and apparatus, including computer programs encoded on computer storage media, for presenting user profiles on a user interface. In some implementations, a server receives a request to view profiles for each of one or more other users from a client device associated with a requesting user. The server applies matching criteria to a profile of the requesting user and profiles for respective users to identify profiles for a sequence of profiles. The server enables sequential display of information representative of the identified profiles on a user interface of the client device, including enabling display of first information representative of a first profile of the identified profiles, determining a user review attribute for the first profile, dynamically adjusting the sequence of profiles based on the user review attribute, and enabling display of second information representative of a second profile of the identified profiles in the adjusted sequence of profiles.

20 Claims, 14 Drawing Sheets

(56) References Cited

U.S. PATENT DOCUMENTS

| | | |
|---|---|---|
| 8,095,368 B2 | 1/2012 | Kumar |
| 8,244,612 B2 | 8/2012 | Chakiris et al. |
| 8,315,442 B2 | 11/2012 | Gokturk et al. |
| 8,345,982 B2 | 1/2013 | Gokturk et al. |
| 8,583,563 B1 | 11/2013 | Bonilla et al. |
| 8,612,359 B2 | 12/2013 | Hull et al. |
| 8,732,030 B2 | 5/2014 | Gokturk et al. |
| 8,813,107 B2 | 8/2014 | Higgins et al. |
| 8,825,767 B2 | 9/2014 | Sivavakeesar et al. |
| 8,840,013 B2 | 9/2014 | Roundtree et al. |
| 8,856,375 B2 | 10/2014 | Martinez et al. |
| 8,886,544 B2 | 11/2014 | Munoz Torres |
| 8,909,771 B2 | 12/2014 | Heath et al. |
| 8,935,257 B1 | 1/2015 | Heath |
| 9,008,435 B2 | 4/2015 | Gokturk et al. |
| 9,020,845 B2 | 4/2015 | Marlowe et al. |
| 9,037,648 B2 | 5/2015 | Ogilvie et al. |
| 9,560,156 B1 | 1/2017 | Rana et al. |
| 9,602,495 B2 | 3/2017 | Wyn-Harris |
| 9,619,567 B2 | 4/2017 | Roundtree et al. |
| 9,667,366 B2 | 5/2017 | Herickhoff et al. |
| 9,672,336 B1 | 6/2017 | Spence |
| 9,721,253 B2 | 8/2017 | Gideoni et al. |
| 9,830,388 B2 | 11/2017 | Andress et al. |
| 9,917,826 B2 | 3/2018 | Wyn-Harris |
| 9,959,023 B2 | 5/2018 | Rad et al. |
| 9,961,053 B2 | 5/2018 | Yedidi et al. |
| 10,063,714 B2 | 8/2018 | Chakiris et al. |
| 10,073,958 B2 | 9/2018 | Spence |
| 10,102,546 B2 | 10/2018 | Heath |
| 10,127,564 B2 | 11/2018 | Heath |
| 10,140,620 B2 | 11/2018 | Heath |
| 10,146,922 B2 | 12/2018 | Guidotti et al. |
| 10,152,722 B2 | 12/2018 | Heath |
| 10,230,713 B2 | 3/2019 | Wyn-Harris |
| 10,248,800 B2 | 4/2019 | Nicholls |
| 10,255,724 B2 | 4/2019 | Barbaro Altieri |
| 10,257,173 B2 | 4/2019 | Nicholls |
| 10,321,842 B2 | 6/2019 | Garten et al. |
| 10,412,139 B2 | 9/2019 | Rands |
| 10,460,566 B2 | 10/2019 | Amaitis et al. |
| 10,484,329 B2 | 11/2019 | Zhang et al. |
| 10,492,981 B1 | 12/2019 | Kumar |
| 10,496,170 B2 | 12/2019 | Vartanian et al. |
| 10,510,214 B2 | 12/2019 | Amaitis et al. |
| 10,540,630 B2 | 1/2020 | Erez et al. |
| 10,548,001 B1 | 1/2020 | Shelley |
| 10,564,806 B1 | 2/2020 | Gray et al. |
| 10,565,272 B2 | 2/2020 | Brunn et al. |
| 10,587,601 B2 | 3/2020 | Wyn-Harris |
| 10,620,812 B2 | 4/2020 | Jon et al. |
| 10,642,939 B2 | 5/2020 | Toplyn |
| 10,664,893 B2 | 5/2020 | Herbst et al. |
| 10,685,488 B1 | 6/2020 | Kumar |
| 10,706,233 B2 | 7/2020 | Cookson et al. |
| 10,728,398 B2 | 7/2020 | Chakiris et al. |
| 10,778,715 B2 | 9/2020 | Oikarinen et al. |
| 10,791,084 B2 | 9/2020 | Bhagwan et al. |
| 10,798,193 B2 | 10/2020 | Wu et al. |
| 10,805,372 B2 | 10/2020 | Rands |
| 10,831,766 B2 | 11/2020 | Plasmeier et al. |
| 10,832,219 B2 | 11/2020 | Jersin et al. |
| 10,834,268 B2 | 11/2020 | Chakiris et al. |
| 10,846,941 B2 | 11/2020 | Altieri |
| 10,867,257 B2 | 12/2020 | Morris |
| 10,878,817 B2 | 12/2020 | Toplyn |
| 10,887,098 B2 | 1/2021 | Van Der Velden et al. |
| 10,977,289 B2 | 4/2021 | Grabovitch-Zuyev et al. |
| 10,997,703 B1 | 5/2021 | Khalatian |
| 11,032,255 B2 | 6/2021 | Nicholls |
| 11,068,935 B1 | 7/2021 | White et al. |
| 2004/0167794 A1 | 8/2004 | Shostack et al. |
| 2004/0249811 A1 | 12/2004 | Shostack et al. |
| 2004/0260781 A1 | 12/2004 | Shostack et al. |
| 2005/0076109 A1 | 4/2005 | Mathew et al. |
| 2005/0114462 A1 | 5/2005 | Mathew et al. |
| 2006/0059130 A1 | 3/2006 | Weiss et al. |
| 2006/0059159 A1 | 3/2006 | Truong et al. |
| 2007/0087313 A1 | 4/2007 | Vest |
| 2007/0094129 A1 | 4/2007 | Graves et al. |
| 2007/0150233 A1 | 6/2007 | Firehammer et al. |
| 2007/0226062 A1 | 9/2007 | Hughes et al. |
| 2007/0293212 A1 | 12/2007 | Quon et al. |
| 2008/0045186 A1 | 2/2008 | Black et al. |
| 2008/0082426 A1 | 4/2008 | Gokturk et al. |
| 2008/0114629 A1 | 5/2008 | Pavlov et al. |
| 2008/0177640 A1 | 7/2008 | Gokturk et al. |
| 2008/0209075 A1 | 8/2008 | Shamma |
| 2008/0301557 A1 | 12/2008 | Kotlyar |
| 2009/0066722 A1 | 3/2009 | Kriger et al. |
| 2010/0088246 A1 | 4/2010 | Lim |
| 2010/0274815 A1 | 10/2010 | Vanasco |
| 2011/0019662 A1 | 1/2011 | Katis et al. |
| 2011/0055309 A1 | 3/2011 | Gibor et al. |
| 2011/0149809 A1 | 6/2011 | Narayanaswamy |
| 2011/0269520 A1 | 11/2011 | Amaitis et al. |
| 2012/0005045 A1 | 1/2012 | Baker |
| 2012/0028623 A1 | 2/2012 | Verdon |
| 2012/0157177 A1 | 6/2012 | Hughes et al. |
| 2012/0197967 A1 | 8/2012 | Sivavakeesar et al. |
| 2012/0246089 A1 | 9/2012 | Sikes |
| 2012/0254333 A1 | 10/2012 | Chandramouli et al. |
| 2013/0024232 A1 | 1/2013 | Powell |
| 2013/0073387 A1 | 3/2013 | Heath |
| 2013/0073473 A1 | 3/2013 | Heath |
| 2013/0127893 A1 | 5/2013 | Gokturk et al. |
| 2013/0132236 A1 | 5/2013 | Gokturk et al. |
| 2013/0211942 A1 | 8/2013 | Linden et al. |
| 2013/0211943 A1 | 8/2013 | Linden et al. |
| 2013/0268357 A1 | 10/2013 | Heath |
| 2013/0340775 A1 | 12/2013 | Juster et al. |
| 2014/0006129 A1 | 1/2014 | Heath |
| 2014/0019184 A1 | 1/2014 | Herickhoff et al. |
| 2014/0032434 A1 | 1/2014 | Kumar |
| 2014/0221866 A1* | 8/2014 | Quy .............. A61B 5/165 600/300 |
| 2014/0273927 A1 | 9/2014 | Trapp |
| 2014/0324599 A1 | 10/2014 | Munoz Torres et al. |
| 2014/0324604 A1 | 10/2014 | Munoz Torres et al. |
| 2014/0359471 A1 | 12/2014 | Kumar |
| 2015/0134554 A1 | 5/2015 | Clais et al. |
| 2015/0142823 A1 | 5/2015 | Klawitter et al. |
| 2015/0227972 A1 | 8/2015 | Tang |
| 2015/0254566 A1 | 9/2015 | Chandramouli et al. |
| 2015/0356595 A1 | 12/2015 | Sriharsha et al. |
| 2016/0004778 A1 | 1/2016 | Finder |
| 2016/0048875 A1 | 2/2016 | Perl et al. |
| 2016/0127500 A1* | 5/2016 | Rad .............. G06F 16/24 715/733 |
| 2016/0189207 A1 | 6/2016 | Xu et al. |
| 2016/0253428 A1 | 9/2016 | Hasan |
| 2016/0359957 A1 | 12/2016 | Laliberte |
| 2016/0364812 A1 | 12/2016 | Cao |
| 2016/0371589 A1 | 12/2016 | Golbandi et al. |
| 2017/0098236 A1 | 4/2017 | Lee et al. |
| 2017/0109854 A1 | 4/2017 | Birdsong et al. |
| 2017/0223121 A1 | 8/2017 | Fisher et al. |
| 2017/0255907 A1 | 9/2017 | Page-Romer et al. |
| 2017/0318325 A1 | 11/2017 | Ortiz et al. |
| 2018/0018396 A1 | 1/2018 | Roundtree et al. |
| 2018/0150205 A1* | 5/2018 | Rad .............. G06Q 30/02 |
| 2018/0349485 A1* | 12/2018 | Carlisle .............. G06F 16/9535 |
| 2019/0065609 A1 | 2/2019 | Finder |
| 2019/0109911 A1 | 4/2019 | Laliberte |
| 2019/0179516 A1 | 6/2019 | Rad et al. |
| 2019/0246936 A1 | 8/2019 | Garten et al. |
| 2019/0377830 A1 | 12/2019 | Weldemariam et al. |
| 2019/0384392 A1 | 12/2019 | Aimone et al. |
| 2020/0103975 A1 | 4/2020 | Vartanian et al. |
| 2020/0145813 A1 | 5/2020 | Shelley |
| 2020/0204535 A1 | 6/2020 | Wyn-Harris |
| 2020/0219204 A1 | 7/2020 | Moetteli |
| 2020/0286081 A1 | 9/2020 | Anderson |
| 2020/0364986 A1 | 11/2020 | Amaitis et al. |

(56) References Cited

U.S. PATENT DOCUMENTS

| | | |
|---|---|---|
| 2021/0011959 A1 | 1/2021 | Finder |
| 2021/0021684 A1 | 1/2021 | Wu et al. |
| 2021/0042818 A1 | 2/2021 | Becker et al. |
| 2021/0042830 A1 | 2/2021 | Burke |
| 2021/0049348 A1 | 2/2021 | Qureshi |
| 2021/0081758 A1 | 3/2021 | Zadorojniy et al. |
| 2021/0142293 A1* | 5/2021 | Kenthapadi ........... G06F 16/212 |

* cited by examiner

DYNAMIC ADJUSTMENT OF PROFILE FEED IN A SOCIAL NETWORK

CLAIM OF PRIORITY

This application claims priority under 35 U.S.C. § 119 (e) to U.S. Patent Application Ser. No. 63/290,988, filed on Dec. 17, 2021, the entire contents of which are hereby incorporated by reference.

BACKGROUND

The present disclosure relates to computer-implemented methods, systems, and apparatuses for social network applications.

Social networking applications enable individuals to match to other individuals with a goal of developing a personal, romantic, or professional relationship. After two individuals connect in a match, the matched individuals may communicate with one another electronically using the social networking application.

SUMMARY

This specification describes techniques for presenting a sequence of user profiles on a user interface on a social network application.

In an aspect, a method for presenting user profiles on a user interface includes receiving a request to view profiles for each of one or more other users from a client device associated with a requesting user. The requesting user and the other users are users of a social network.

Embodiments can include one or any combination of two or more of the following features.

The method applies matching criteria to a profile of the requesting user and profiles for respective users of the social network to identify profiles for a sequence of profiles. In some implementations, the sequence of profiles for the identified profiles is in a predefined order. The method determines the predefined order for the sequence of profiles. For example, the method orders the profiles based on a similarity between each profile and the profile of the requesting user.

Responsive to receipt of the request to access profiles, the method enables sequential display of information representative of the identified profiles on a user interface of the client device. The method enables display, on the user interface, of first information representative of a first profile of the identified profiles. The first profile is associated with a first user of the social network.

In response to a user interaction with the user interface during display of the first information, the method enables display, on the user interface, of second information representative of a second profile of the identified profiles. The second profile is associated with a second user of the social network. The second profile is the preceding profile in the sequence of profiles before the first profile. The second information representative of the second profile was displayed, in the sequential display on the user interface, immediately before the display of the first information representative of the first profile.

In some implementations, the method, in response to a user interaction with the user interface during display of the second information representative of the second profile, enables display, on the user interface, of the first information representative of the first profile of the identified profiles. The first information representative of the first profile has not previously been displayed on the user interface during a predetermined period of time.

In some implementations, the method dynamically determines the sequence of profiles based on the user interaction with the user interface during display of information representative of each of one or more profiles. The method determines a user review attribute for each displayed profile and based on the user interaction with the user interface. The user interaction with the user interface includes a user interaction with a user selectable element in the user interface. The user interaction with the user selectable element in the user interface includes, for example, one or more of tapping, swiping, dragging, or selecting the user selectable element. The user review attribute for a given profile is based on one or more of time spent interacting with the profile or movement of the pointer when the profile is displayed. Alternatively or in addition, the user review attribute for a given profile is based on eye movement of the user, a facial expression of the user, or a physiological reaction of the user when the profile is displayed. The method determines, based on the user review attribute, (i) profiles to be included in the sequence of profiles or (ii) an order of the profiles included in the sequence of profiles.

The method identifies one or more displayed profiles for which the user review attribute exceeds a predefined threshold. The method identifies one or more similar profiles to the one or more displayed profiles for which the user review attribute exceeds the predefined threshold. The method adjusts the sequence of profiles (i) to include the identified one or more similar profiles or (ii) to advance the one or more similar profiles in the sequence of profiles.

In some implementations, the method receives, from the requesting user, a vote to match with the second user associated with the second profile. Responsive to receiving the vote, the method adds the profile of the requesting user to a second sequence of profiles to be displayed to the second user.

In some implementations, the method receives, through the user interface, a vote not to match with the second user associated with the second profile. The method removes the second profile associated with the second user from the sequence of profiles.

In some implementations, the method receives a request to view multiple profiles concurrently. The method enables display of information representative of a first set of multiple profiles. Each profile of the first set of multiple profiles is associated with a corresponding user of the first set of multiple users of the social network. The method enables display of information representative of a second set of multiple profiles. The second set of multiple profiles is associated with a second set of multiple users of the social network. At least some of the second information representative of the second set of multiple profiles was displayed, in the sequential display on the user interface, immediately before the display of the first information representative of the first set of multiple profiles. The method receives a vote for a particular one of the multiple profiles that are displayed on the user interface.

In some implementations, the method receives, from a client device associated with a requesting user, a request to view profiles for each of one or more other users. The requesting user and the other users are users of a social network. The method applies matching criteria to a profile of the requesting user and profiles for respective users of the social network to identify profiles for a sequence of profiles. Responsive to receipt of the request to access profiles, the method enables sequential display, on a user interface of the client device, of information representative of the identified profiles, including the following process. The method enables display, on the user interface, of first information representative of a first profile of the identified profiles. The first profile is associated with a first user of the social network. The method determines a user review attribute for the first profile. The user review attribute indicates a characteristic of a user interaction with the user interface during display of the first information. The method dynamically adjusts the sequence of profiles based on the user review attribute. The method enables display, on the user interface, of second information representative of a second profile of the identified profiles in the adjusted sequence of profiles.

Embodiments of this aspect can include one or any combination of two or more of the foregoing features.

In an aspect, a computing system includes one or more processors and one or more storage devices storing instructions that are operable, when executed by the one or more processors, to cause the one or more processors to perform operations including receiving, from a client device associated with a requesting user, a request to view profiles for each of one or more other users. The requesting user and the other users are users of a social network. The operations includes applying matching criteria to a profile of the requesting user and profiles for respective users of the social network to identify profiles for a sequence of profiles. The operations includes, responsive to receipt of the request to access profiles, enabling sequential display, on a user interface of the client device, of information representative of the identified profiles, including: enabling display, on the user interface, of first information representative of a first profile of the identified profiles and in response to a user interaction with the user interface during display of the first information, enabling display, on the user interface, of second information representative of a second profile of the identified profiles. The first profile is associated with a first user of the social network. The second profile is associated with a second user of the social network. The second information representative of the second profile was displayed, in the sequential display on the user interface, immediately before the display of the first information representative of the first profile.

In some implementations, the operations include determining a user review attribute for the first profile. The user review attribute is indicative of a characteristic of a user interaction with the user interface during display of the first information. The operations includes dynamically adjusting the sequence of profiles based on the user review attribute.

Embodiments of the subject matter described in this specification can be implemented so as to realize one or more of the following advantages. First, the approaches described here can improve the quality of matches. For example, the social network application allows a user to navigate through a sequence of profiles of other users both in backward and forward directions, enabling users to vet various potential matches before choosing to vote on any given profile. The sequential presentation of profiles can also enable the user to find a match quickly, e.g., by displaying the most similar profile first in the sequence, thereby conserving bandwidth that would have been expended in a prolonged profile viewing session. Third, the sequence of profiles can be dynamically adjusted so that relevant matches are quickly and effectively presented to the user.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

The present disclosure relates to approaches to presenting a sequence of user profiles on a user interface of a social network application, e.g., a social network application in the context of dating, professional recruiting or networking, interest-based discussion, or other suitable context. The social network application identifies potential matches between a particular user of the social network application (referred to as the requesting user) and one or more other users of the social network application. Profiles for those potential matches are presented to the requesting user in sequence interface. The profile in the sequence can be presented one profile at a time or multiple profiles concurrently. The requesting user can navigate forwards to see the next profile in the sequence. The requesting user can also move backwards to see the previous profile in the sequence, e.g., the profile that was displayed immediately prior to the currently displayed profile. The user can vote to establish a match with one or more other users of the social network application whose profiles are displayed on the user interface.

In some implementations, the social network application identifies potential matches between a particular user of the social network application and a set of users (also referred to as a group). The group is associated with one or more categories, e.g., a particular topic or interest. For example, a set of users may belong to a group that includes students who went to the same high school. As another example, a set of users may belong to a group of dog owners. As yet another example, a set of users may belong to a group who likes to watch horror movies. The social network application identifies a potential match for a user for each existing and new groups. For example, the social network application may identify a set of users who might be interested in forming a group. The requesting user can navigate forwards and backwards to see the group suggested by the social network. The requesting user and a group, e.g., a representative user or each users in the group (e.g., following a majority's decision), can vote to establish a match.

Figure 1:
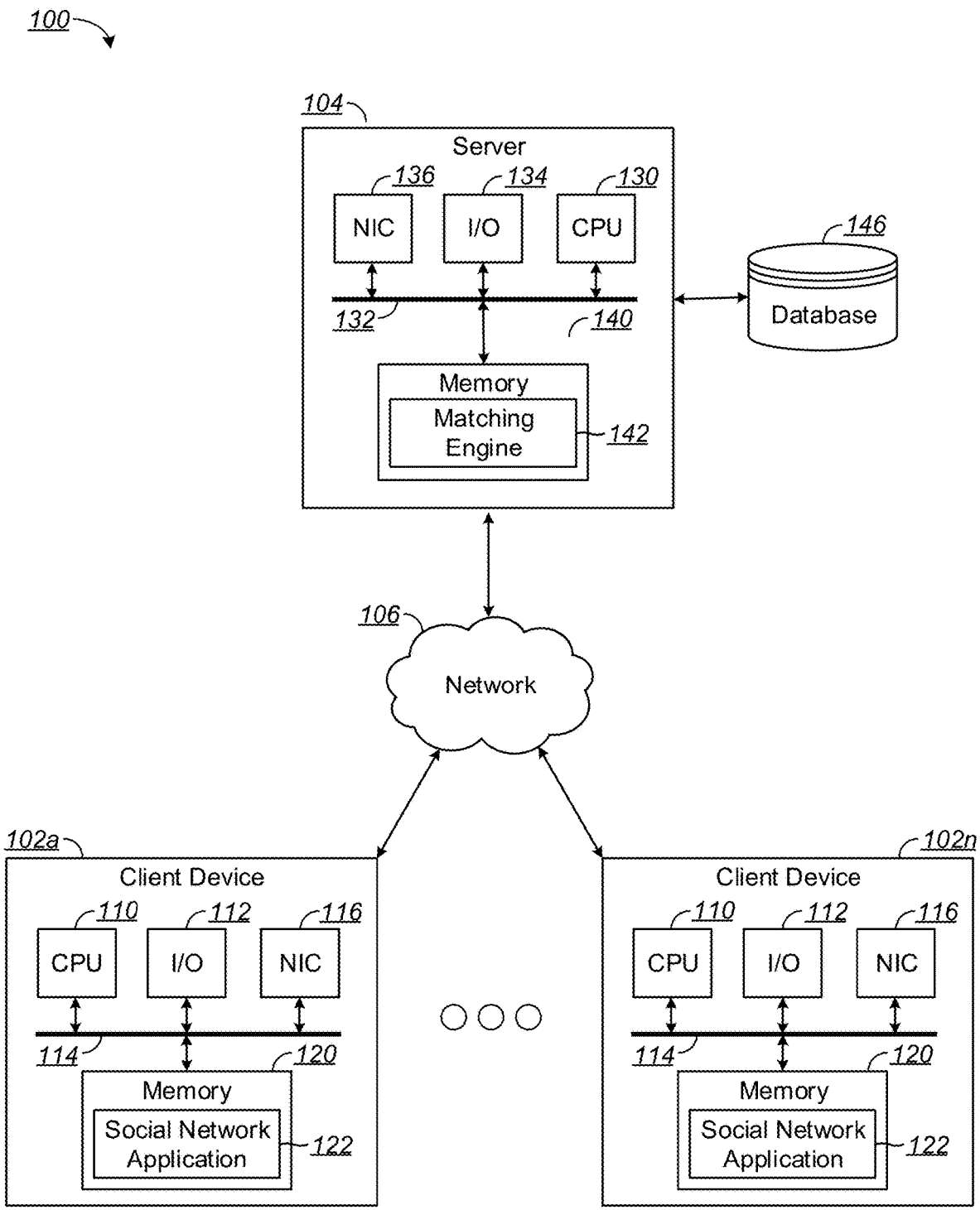
FIG. 1 illustrates an example of a social network system.

FIG. 1 illustrates an example of a social network system 100. The system 100 includes a plurality of client devices 102a through 102n in communication with a server 104 via a network 106, which may be a wired or wireless network or any combination thereof. Each client device 102a through 102n (referred to collectively as client devices 102) includes one or more processors (e.g., central processing unit) 110 in communication with input/output devices 112 via a bus 114. The input/output devices 112 can include a touch display, keyboard, mouse, and the like. A network interface circuit 116 is also connected to the bus 114 to provide wired and/or wireless connectivity to the network 106. A memory or other storage medium 120 is also connected to the bus 114. The memory 120 stores instructions executed by the processor 110. In particular, the memory 120 stores instructions for a social network application 122, such as a dating application, which communicates with the server 104 to coordinate interactions between users that have been identified as potential matches (e.g., potentials friends, dating partners, business partners, etc.). In some implementations, each client device 102 is a mobile device (e.g., smartphone, laptop, tablet, wearable device, etc.) executing the social network application 122. Different client devices 102 are operated by different users that subscribe to the same social network application 122.

The server 104 includes one or more processors 130, bus 132, input/output devices 134 and a network interface circuit 136 to provide connectivity to the network 106. A memory 140 is connected to the bus 132. The memory 140 stores a matching engine 142 with instructions executed by the processors 130 to implement social networking operations, such as matching of users, display of profiles, and enablement of interaction between users. In some implementations, the system 100 includes a database 146 in communication with the server 104 that stores information for use by the social network application 122 and/or the matching engine 142. For instance, the database 146 can store user profile information, match information, message information, or other information. In some implementations, the system 100 processes information in the database 146 (e.g., by generating fast-access identifiers or references) such that the access to the information is computationally efficient. For example, the system 100 can apply the filter of a particular user to the database 146 to obtain records associated with the particular user. In some implementations, the system 100 optimizes a structure of the database 146 based on a data processing bandwidth to facilitate load balancing.

Figure 2A:
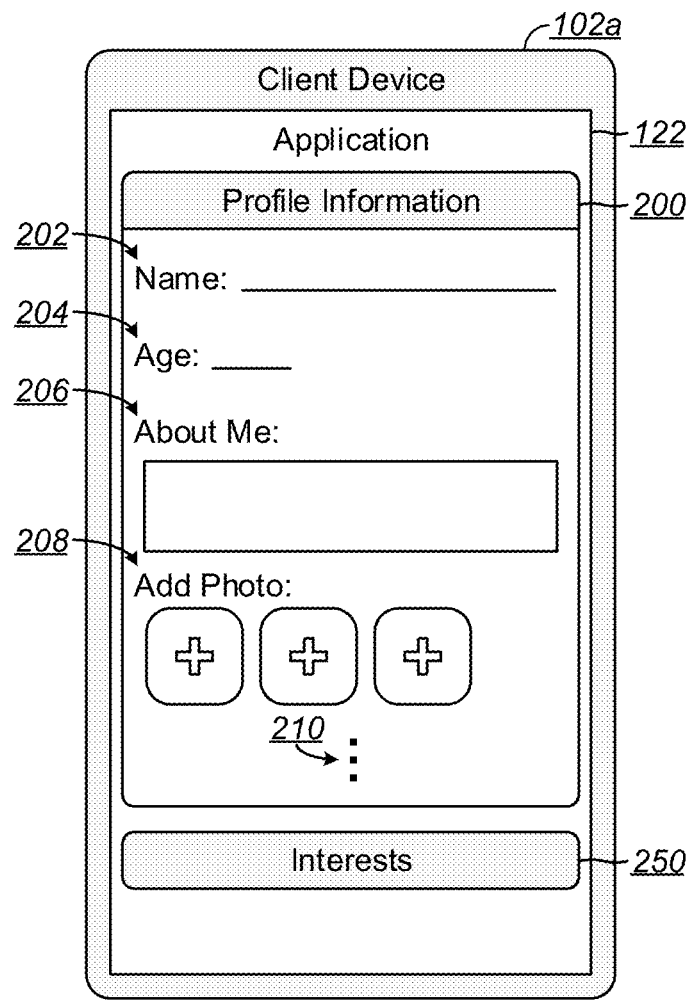
FIGS. 2A-2B illustrate an example user interface.
Figure 2B:
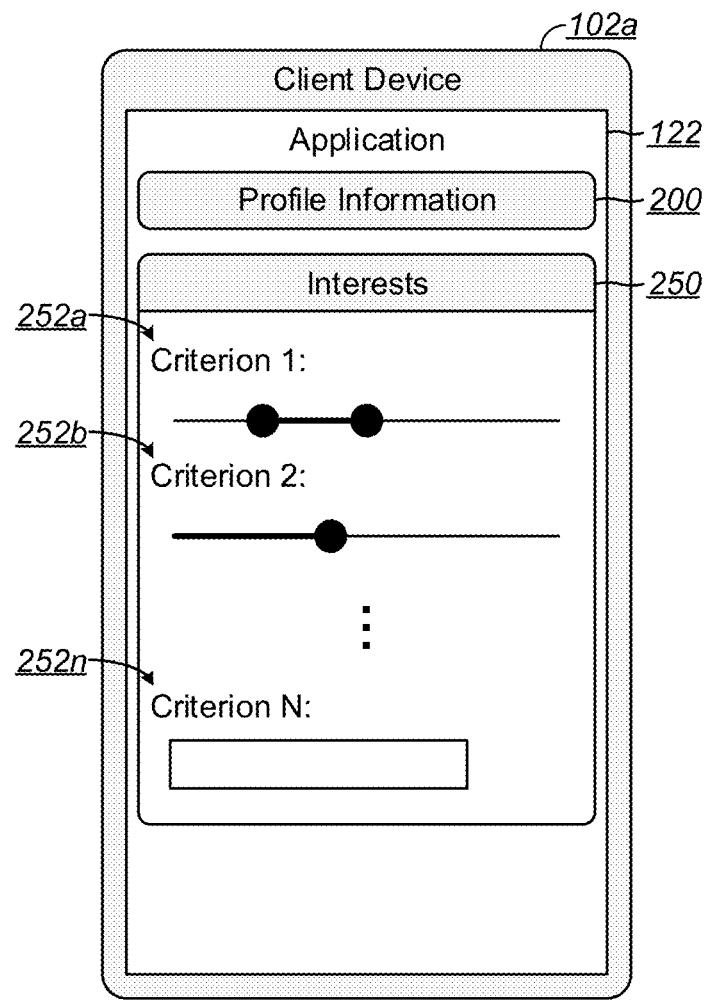

In operation, a user of a client device 102 can create a personal profile to participate in the social network application 122. For example, referring to FIG. 2A, a user can create a personal profile by interacting with a user interface to provide profile information 200, such as their name 202, age 204, biographical text 206, photographs 208, and a range of other information 210 (e.g., city, links to social network profiles on other networks, etc.) that allow the user to characterize himself or herself. The user can specify their interests 250 for use in identifying potential matches. For example, as shown in FIG. 2B, a user can specify their interests 250 by interacting with a user interface to provide various criteria 252a through 252n that the user is looking for in a potential match, such as age, distance, hobbies, commitment disposition, or combinations of them, among others. In some implementations, the system 100 (e.g., the matching engine 142) can identify one or more criteria instead of or in addition to those specified by the user based on, for example, analysis of the user's interactions with the system 100.

The system 100 (e.g., the matching engine 142) applies matching criteria to a profile of a given user (referred to as the "requesting user") and profiles for respective other users of the social network application 122. For example, the matching engine 142 can derive matching criteria from the interests 250, and can use the matching criteria to identify potential matches. In general, the matching engine 142 can use filters, applied rules, machine learning, or combinations of them, among others, to identify potential matches for the requesting user. For example, the matching engine 142 can generate one or more filters or rules based on the interests of the requesting user, and can apply the filters or rules to profile information for other users to identify potential matches for the requesting user. The matching engine 142 can include a machine learning model (e.g., a neural network model) trained to identify features from the interests of the requesting user, and the machine learning model can process profile information for other users to identify potential matches for the requesting user.

In some examples, the matching engine 142 can rank the profiles of the identified potential matches, e.g., based on similarities between the profile of the requesting user and the profiles of the identified potential matches. In an example, the matching engine 142 ranks the profiles based on how the interests of an identified potential match aligns with the requesting user's interests; a profile of an identified potential match whose interests align most closely with those of the requesting user is ranked highest among the profiles of the identified potential matches. Other factors, such as location, age, or other factors, can also be used in ranking the profiles.

In some implementations, the matching engine 142 identifies a potential match between the requesting user and a set of users, e.g., who belong to an existing group or who share a similar interest but have not yet formed a group. The matching engine 142 can rank the groups based on how the interests of the requesting user aligns with one or more categories the respective group is associated with.

The profiles of the identified potential matches, e.g., between a first user and a second user, between a first user and a first group, and between a first user and a set of other users who have not yet formed a group, are presented to the requesting user in sequence on a user interface, e.g., according to their ranking. The user can scroll forwards and backwards through the sequence of profiles to view both subsequent profiles in the sequence (e.g., profiles that have not yet been presented to the requesting user within some time period, e.g., within the current browsing session) and previous profiles in the sequence (e.g., profiles that have previously been presented to the requesting user). This approach to bidirectional navigation through the sequence of profiles provides the requesting user with fine-grained control over the profiles that he or she views and enables the requesting user to take his or her time before deciding whether to vote to match with a given profile.

Figure 3:
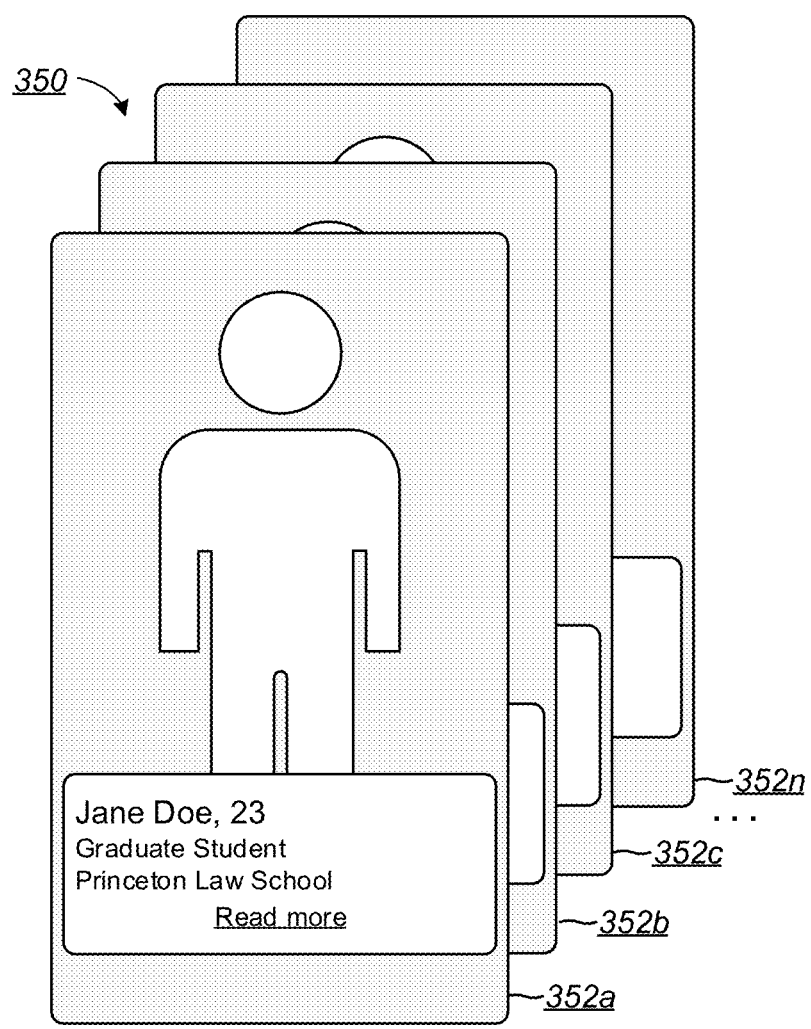
FIG. 3 is a schematic diagram of a sequence of profiles.

FIG. 3 illustrates an example sequence 350 of profiles 352a-n for presentation to a requesting user, each corresponding to a different user of the application 122. For example, a first profile 352a in the sequence 350 is associated with Jane Doe. In some examples, the profiles in the sequence 350 are in a predetermined order, e.g., ranked based on similarity, with the profile of the requesting user with the profile 352a being the highest ranked and each successive profile 352b-352n being the next lower in rank. In some examples, the sequence of profiles is randomly generated, e.g., from among the profiles that meet a threshold level of similarity with the profile of the requesting user. The randomly generated sequence of profiles can be determined prior to display of the profiles to the requesting or can be generated in real time as the user views the profiles. In some implementations, some of the profiles in the example sequence 350 includes group profiles. A group profile is a profile of a set of users who belong to a same group, e.g., based on shared interests. In some implementations, a group profile includes the profile of a representative member from the group. In some implementations, a group profile includes a set of representative profiles of some of the members of the group.

In the example sequence 350 of FIG. 3, the first profile 352a is initially presented to the requesting user. Because the profile 352a is the first profile to be presented, the user can only navigate forwards through the sequence 350, to the next profile 352b. From the profile 352b, the requesting user can move forwards or backwards through the sequence of profiles 350. For instance, the user can navigate forwards again to the next profile 352c or backwards through the sequence to the previously presented profile 352a. When there are multiple prior profiles, the user can navigate backwards through each one in turn. For instance, from the profile 352c, the user can navigate backwards through the sequence 350 to the previous profile 352b and then backwards again to the previous profile 352a. Navigation forwards or backwards through the sequence of profiles can help the requesting user to effectively identify profiles with which he or she may wish to match, e.g., by providing the ability to return to a previously viewed profile, e.g., after comparing that profile to subsequently presented profiles.

Figure 4A:
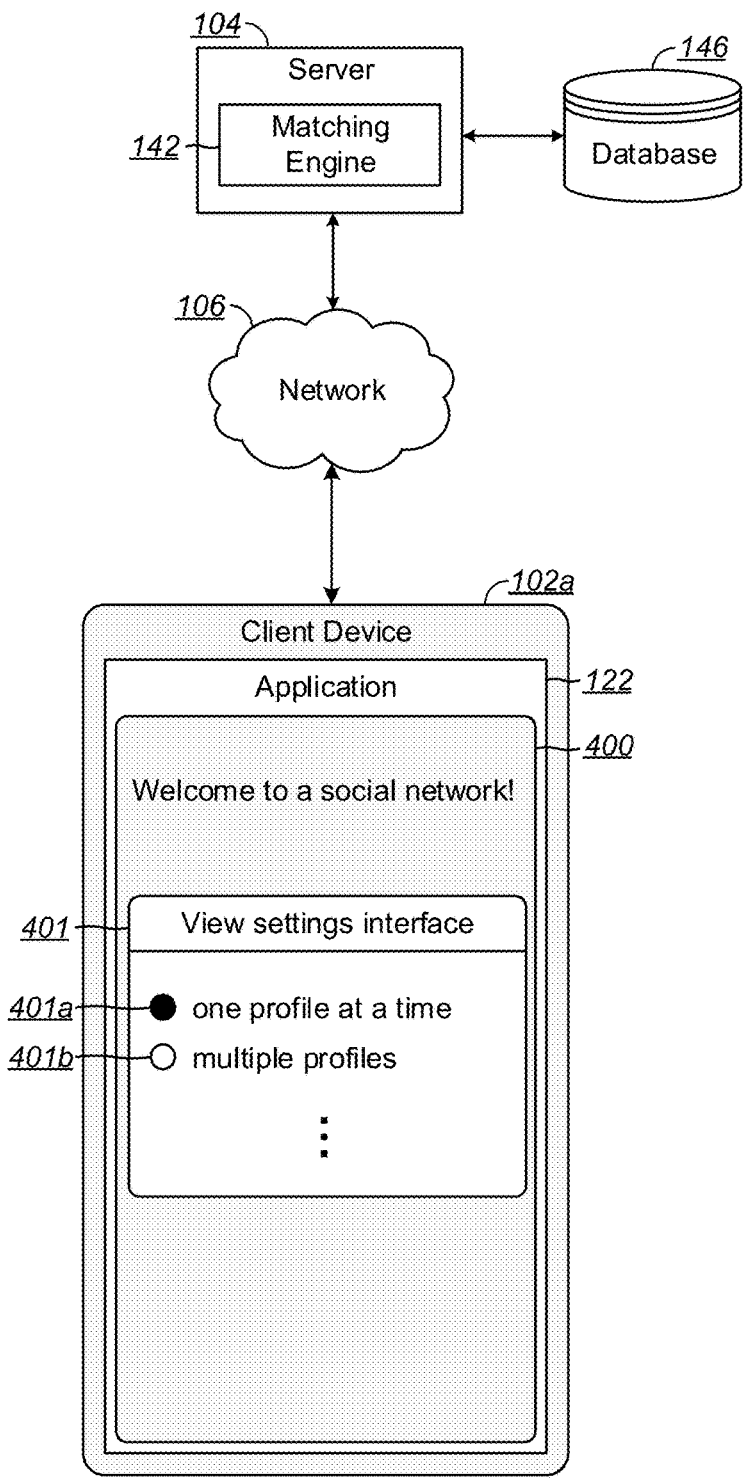
FIGS. 4A-4D illustrate an example user interface.

FIG. 4A illustrates an example interface 400, also referred to as a matching feed, displayed on a client device 102a on which profiles of identified potential matches are presented sequentially to a requesting user operating the client device 102a. The matching feed 400 includes a user selectable element for the requesting user to request to view profiles for each of one or more other users of the social network application. In the example of FIG. 4A, the user selectable element is implemented as a view settings interface 401. The view settings interface 401 presents multiple settings 401a-401b for the requesting user to indicate whether he or she would like to view one profile at a time (setting 401a) or multiple profiles concurrently (setting 401b). In some implementations, the system 100 (e.g., the matching engine 142) sets one of the available settings as a default setting, e.g., setting 401a for display of one profile at a time, and thus the requesting user can simply select to view profiles without specifying a setting. In some implementations, the view settings interface 401 presents an option whether the requesting user would like to be matched with a group.

Figure 4B:
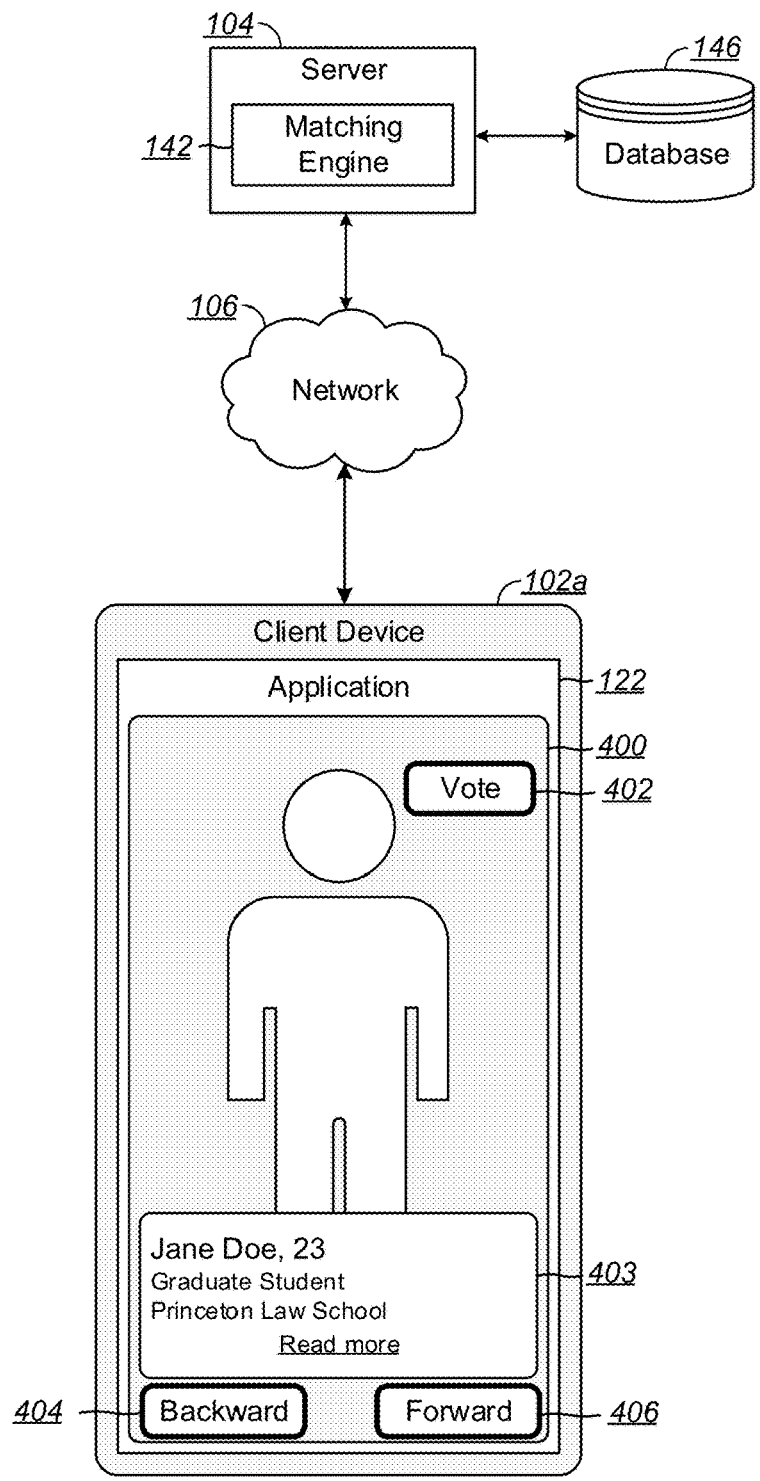

Referring to FIG. 4B, when the user selects the option to view one profile at a time, the matching feed 400 displays a first profile 403 associated with a first user, (here, Jane Doe) of the sequence of profiles. In some implementations, Jane Doe's profile 403 is the first profile in the sequence 350, e.g., the highest ranked profile based on similarity to the requesting user's profile. In some implementations, e.g., when the profiles are not ranked, Jane Doe's profile 403 is a randomly selected profile from among the profiles of identified potential matches with the requesting user. The displayed profile 403 includes information such as a name, age, biographical text, photographs, or a range of other fields (e.g., city, links to social media profiles on other networks, etc.).

Figure 4C:
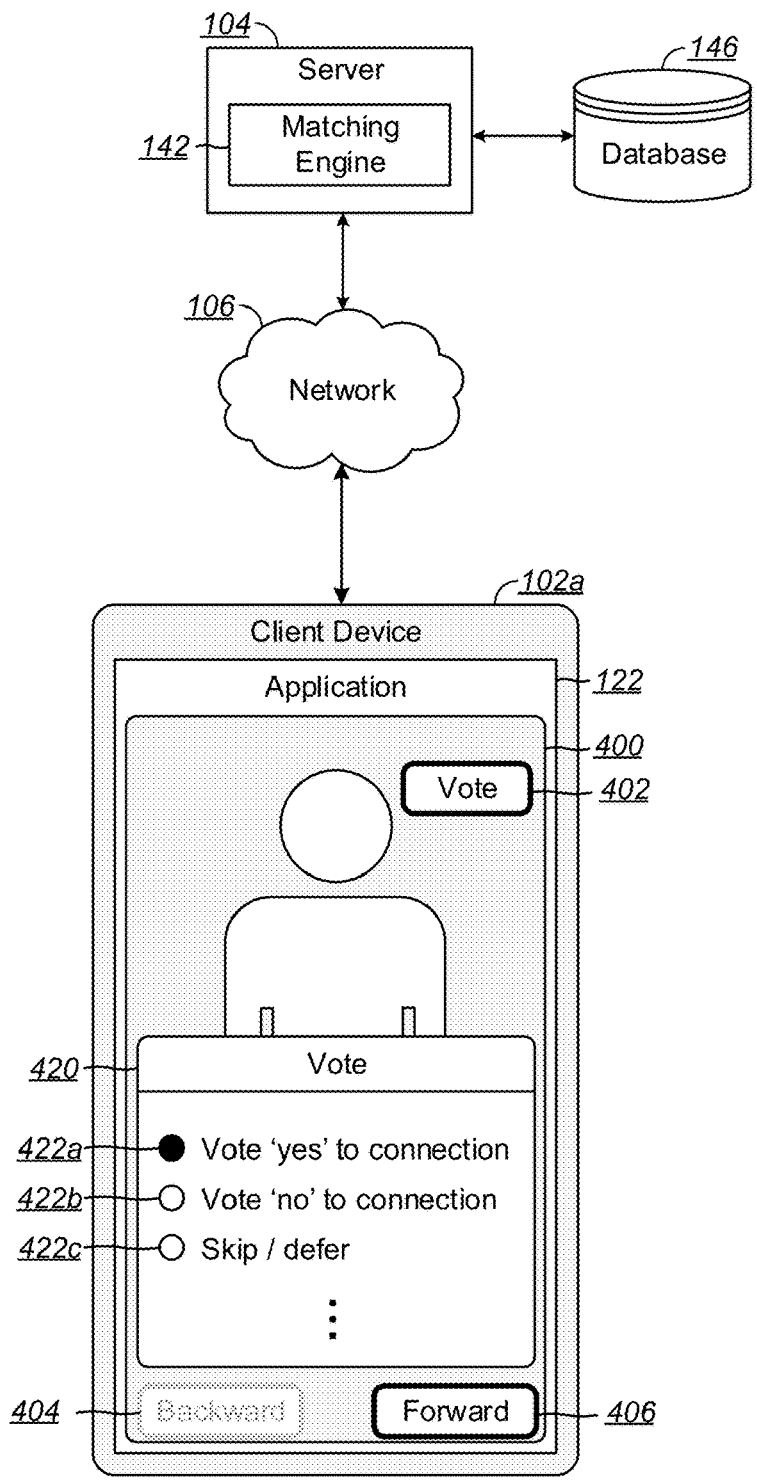

The matching feed 400 includes a selectable element 402 that allows the requesting user to vote to match with the first user (e.g., Jane Doe) associated with the displayed profile 403. In some implementations, the first user is a representative user from an existing group. Matching with the first user, in this instance, indicates matching with the particular group the first user belongs to. FIG. 4C illustrates a vote interface 420 that is displayed in the matching feed 400 in response to the requesting user's interaction with the selectable element 402, e.g., tapping, swiping, dragging, or selecting the element 402. The vote interface 420 provides an option to vote 'yes' 422a, an option to vote 'no' 422b, and an option to 'skip/defer' 422c. A 'yes' vote indicates that the requesting user would like to match with Jane Doe. A 'no' vote indicates that the requesting user is not interested in matching with Jane Doe. In the example of FIG. 4C, the vote options 422a-422c are presented as radio buttons. In some implementations, the requesting user can vote to match with the first user associated with the displayed profile 403 by swiping (e.g., clicking and dragging the matching feed 400 or the displayed profile 403 using fingers) off the screen in a certain direction (e.g., right to vote 'yes'; left to vote 'no'; up to 'skip/defer'). Other input methods can also be used to indicate a vote.

In some implementations, when the requesting user votes 'yes' on a displayed profile 403, the system adds the requesting user's profile to the sequence of profiles to be presented to the user (e.g., Jane Doe) associated with the displayed profile 403. In some implementations, the user (e.g., Jane Doe) who is associated with the displayed profile 403 is notified of the requesting user's 'yes' vote given the opportunity to view the requesting user's profile of the requesting user and vote for the requesting user.

When the requesting user votes 'no' on a displayed profile 403, the system removes the displayed profile 403 from the set of identified potential matches such that that profile is not displayed to the requesting user again. In some implementations, the requesting user's profile is also removed from the set of identified potential matches to the other user (e.g., Jane Doe's set of identified potential matches). The removal of the profile(s) from the respective set of identified potential matches can be permanent or for a given time period, e.g., the current browsing session, 24 hours, a week, or another time period.

Referring again to FIG. 3, the user can view additional profiles from the sequence of profiles 350. The matching feed 400 includes a forward selectable element 406 that allows the requesting user to view the next profile in the sequence of profiles of identified potential matches. The next profile in the sequence can be a profile that has not previously been presented to the requesting user in a given time period, e.g., the current browsing session, the past 24 hours, the past week, or another time period. The matching feed 400 also includes a backward selectable element 404 that allows the requesting user to view the immediately preceding profile in the sequence 350, e.g., the profile that was displayed immediately before the currently displayed profile 403. In some implementations, when the currently displayed profile 403 is the first profile to have been presented to the requesting user in a given time period, the matching feed 400 does not display the backward selectable element 404 or (as shown in FIG. 4C), displays an inactive version of the backward selectable element 404.

Figure 4D:
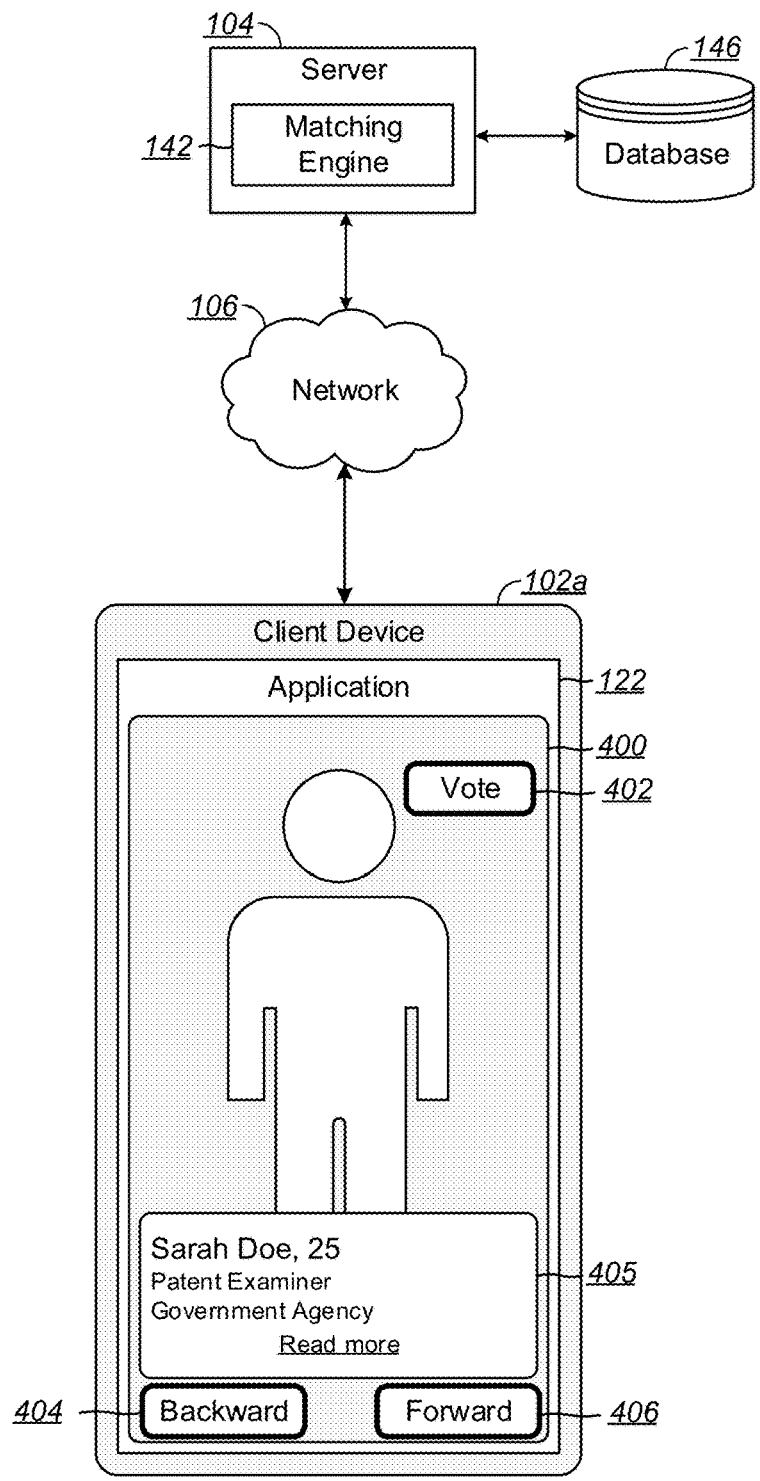

Referring also to FIG. 4D, when the requesting user selects the forward selectable element 406, the matching feed 400 displays Sarah Doe's profile 405. Sarah Doe's profile 405 is immediately after Jane Doe's profile 403 in the sequence of profiles 350 to be presented to the requesting user. For instance, when the profiles in the sequence 350 are ranked, Sarah Doe's profile 405 is ranked second after Jane Doe's profile 403. When the profiles in the sequence 350, Sarah Doe's profile 405 is a randomly selected profile from among the profiles of identified potential matches with the requesting user. The user can vote on Sarah Doe's profile 405, e.g., as described above.

From Sarah Doe's profile 405, the requesting user can view the next profile in the sequence 350 by selecting the forward selectable element 406. Alternatively, the requesting user can select the backward selectable element 404 to view the profile immediately before Sarah Doe's profile 405 in the sequence 350. In some implementations, selection of the backward selectable element 404 from the display of a given profile causes display of the profile that was displayed immediately prior to display of the given profile. For instance, when the requesting user selects the backward selectable element 404 from the display of Sarah Doe's profile 405, the matching feed 400 displays Jane Doe's profile 403 again.

In some implementations, the profile that is displayed responsive to selection of the backward selectable element 404 depends on the requesting user's votes on the previously displayed profiles. As discussed above, the profile of a user on which the requesting user has voted 'no' is removed from the sequence of profiles 350. When a profile is removed from the sequence of profiles 350, that removed profile is no longer available for display as part of the sequence. For instance, following the example of FIGS. 4B and 4D, the requesting user voted 'skip/defer' to Jane, 'no' to Sarah, and is currently viewing Anna's profile, which was the next profile in the sequence 350 following Sarah's profile. Because the requesting user voted 'no' to Sarah, Sarah's profile has been removed from the sequence 350 of profiles. Thus, when the requesting user selects the backward selectable element from the display of Anna's profile, the matching feed 400 displays Jane's profile, not Sarah's profile.

In some implementations, the requesting user can modify their previous vote when they return to a previously viewed profile using the backward selectable element 404. In some implementations, modifying a previous vote to match is limited to a predefined time from the time the requesting user first entered the vote, e.g., one minute. In some implementations, the requesting user can modify a previous vote for a given other user as long as that other user has not yet been notified or has not yet voted on the requesting user.

Referring again to FIG. 4A, the requesting user can select the setting 401b on the view settings interface 401 to view multiple profiles concurrently (also referred as a panoramic feed).

Figure 5A:
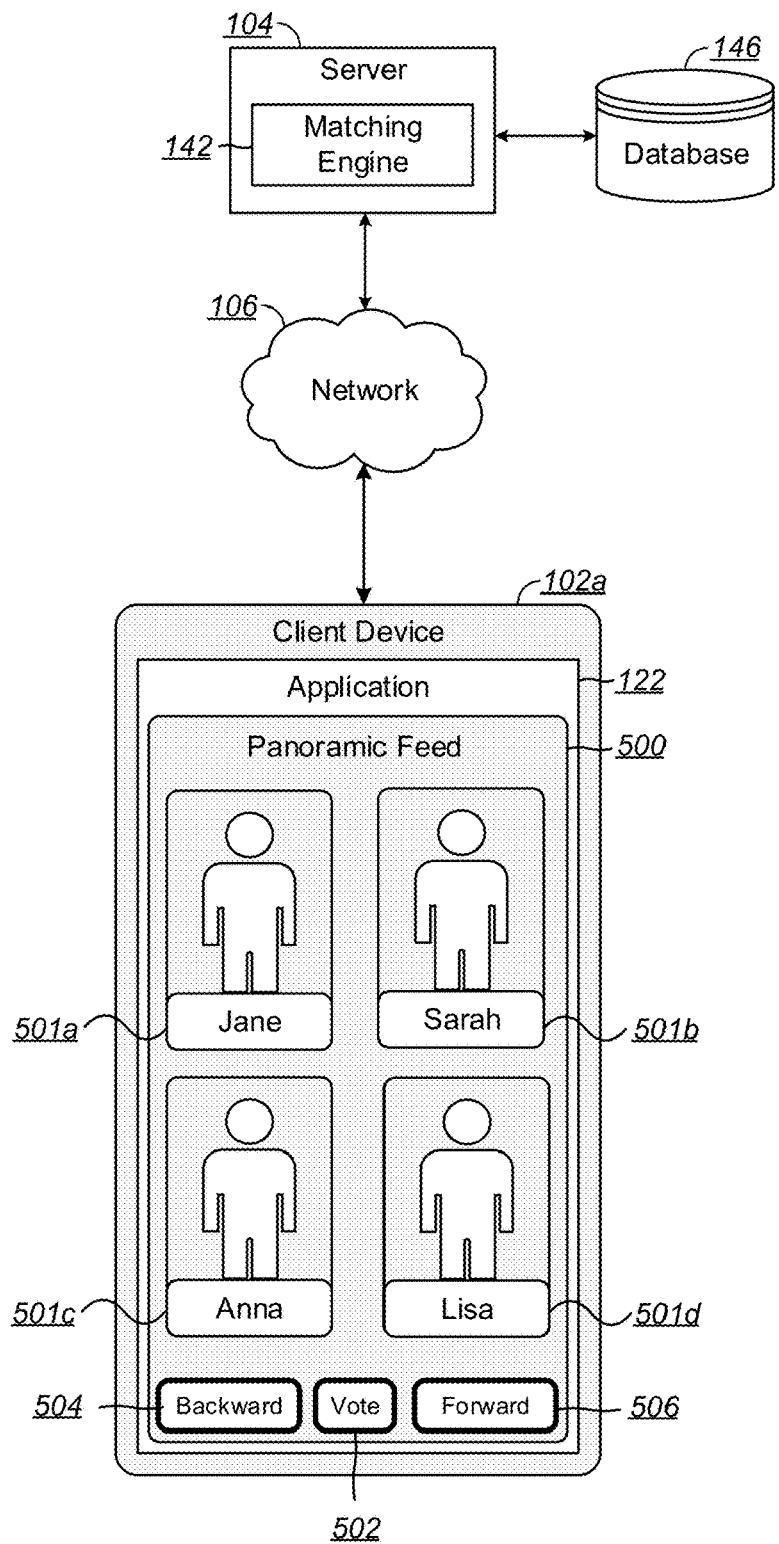
FIGS. 5A-5B illustrates an example user interface.

FIG. 5A illustrates a panoramic feed 500 displaying a panoramic view of multiple profiles 501a-501d. In some implementations, the panoramic view includes multiple group profiles. Each group profile represents an existing group that includes two or more users of the application. The profiles of the identified potential matches are presented as sets of multiple profiles concurrently to the requesting user in sequence on the user interface, e.g., according to their ranking. The panoramic feed 500 presents a predetermined number (N) of profiles concurrently from the sequence of the profiles. For example, for a sequence that includes Jane, Sarah, Anna, Lisa, Olivia, Emma, Sophia, and Harper, the panoramic feed 500 presents Jane's, Sarah's, Anna's, and Lisa's profiles 501a-501d (for the case that Nis 4). In some implementations, the requesting user can customize the number of profiles to be displayed concurrently. In some implementations, the system 100 can determine the number of profiles to be displayed concurrently based on attributes of the user's device, such as a screen size.

Each displayed profile includes profile information such as names (illustrated), age, biographical text, photographs, or a range of other fields. The requesting user can select one of the displayed profiles in the panoramic feed to view additional profile information for the selected profile. For example, when the requesting user selects Jane's profile 501a, detailed information from Jane's profile is displayed.

The panoramic feed 500 includes a selectable element 502. As described above, the selectable element 502 allows the requesting user to vote to match with a user whose profile information is displayed in the panoramic feed 500. The requesting can interact with the selectable element 502, e.g., tapping, swiping, dragging, or selecting the element 502 and subsequently specifying to vote 'yes', 'no', or 'skip/defer' (e.g., as described above for the selectable element 402).

In some implementations, when the requesting user votes 'yes' on a displayed profile (e.g., Jane's profile 501a), the system adds the requesting user's profile to the sequence of profiles to be presented to the user (e.g., Jane) associated with that profile and/or notifies the user of the requesting user's 'yes' vote. When the requesting user votes 'no' on a displayed profile, the system removes that profile from the requesting user's set of identified potential matches, e.g., as described above. In some implementations, the requesting user's profile is also removed from the set of identified potential matches to the other user. The removal of the profile(s) from the respective set of identified potential matches can be permanent or for a given time period, e.g., the current browsing session, 24 hours, a week, or another time period.

The panoramic feed 500 includes a forward selectable element 506 that allows the requesting user to view a new set of N profiles in the sequence of profiles of identified potential matches. The next set of N profiles can be profiles that have not previously been presented to the requesting user in a given time period, e.g., the current browsing session, past 24 hours, or past week. For example, referring to FIG. 5B, the panoramic feed 500 displays the next set of N profiles 501e-501h, e.g., Olivia's, Emma's, Sophia's, and Harper's profiles, responsive to the requesting user's selection of the forward selectable element 506.

Figure 5B:
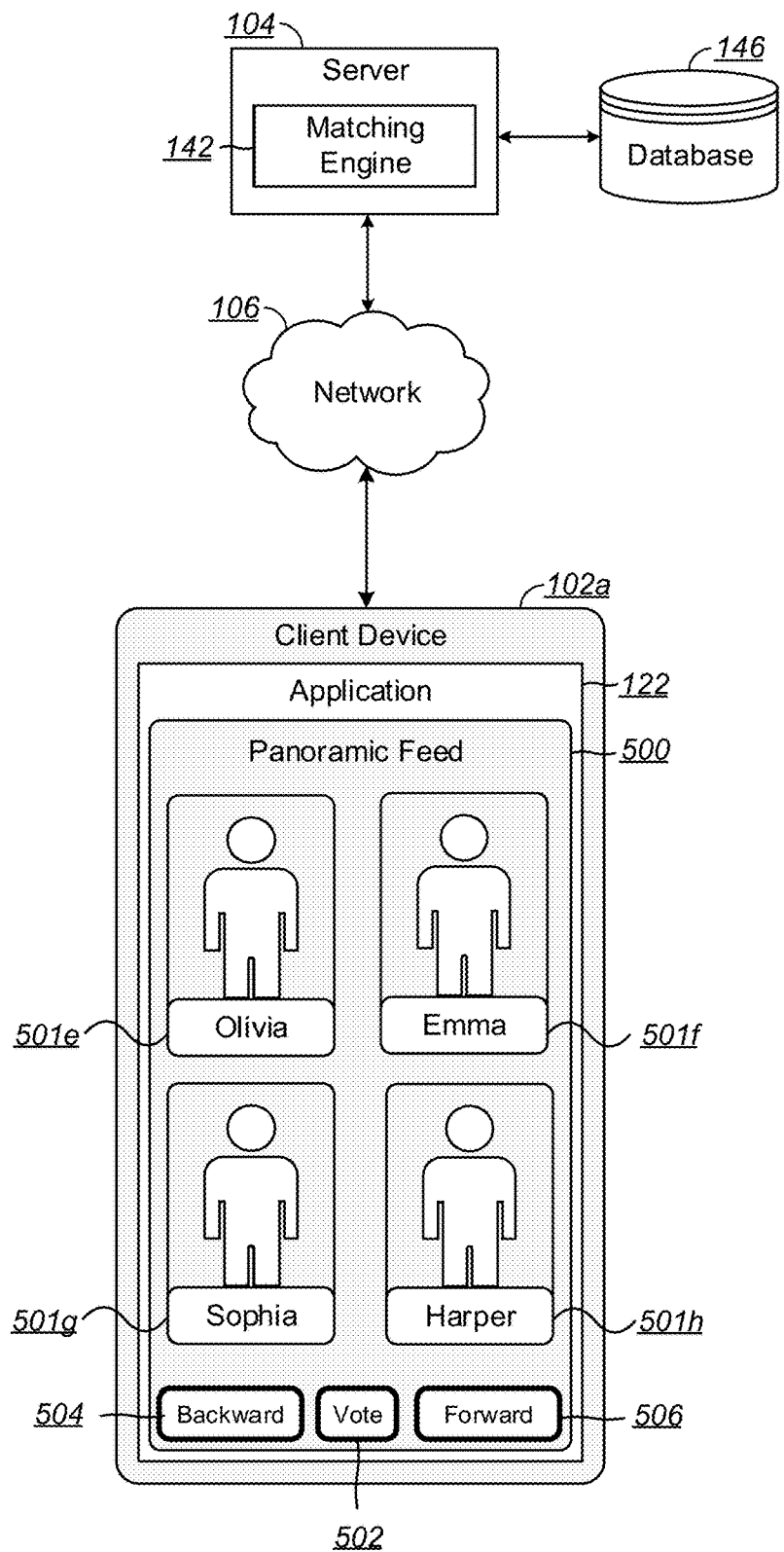

The panoramic feed 500 includes a backward selectable element 504 that allows the requesting user to view the set of N preceding profiles in the sequence, e.g., the N profiles that were displayed immediately before the currently displayed set of profiles. For example, from the display of the profiles 501e-501h as shown in FIG. 5B, the requesting user can view the N preceding profiles in the sequence (the Jane's, Sarah's, Anna's, and Lisa's profiles 501a-501d) by selecting the backward selectable element 504.

In some implementations, when the first set of profiles is the only set of profiles presented to the requesting user so far, the panoramic feed 500 does not display the backward selectable element 504, or displays an inactive version of the backward selectable element 504.

In some implementations, the system removes the profile of a user for which the requesting user has voted for 'no.' For example, from FIG. 5A where the requesting user votes 'no' to Lisa among the first set of profiles, Lisa's profile is removed from the sequence of profiles. The sequence then becomes Jane, Sarah, Anna, Olivia, Emma, Sophia, and Harper. The user can then select the forward selectable element 506, and the next set of profiles in the sequence (here, Olivia's, Emma's, Sophia's, and Harper's profiles as shown in FIG. 5B) is presented to the requesting user. From FIG. 5B, when the requesting user then selects the backward selectable element 504, the panoramic feed 500 displays Jane's, Sarah's, Anna's, and Olivia's profiles, without Lisa's profile, which was previously removed from the sequence. Olivia's profile is presented along with Jane's, Sarah's, and Anna's profiles, because Olivia's profile is now the next profile in the sequence after Anna's profile.

In some implementations, the sequence of profiles is in a predefined order, meaning the sequence is not dynamically changed depending on the requesting user's behavior. In some implementations, the sequence of profiles for the identified potential matches for a requesting user is dynamically determined or adjusted upon the requesting user's interaction with the matching feed 400 or based on detecting change in the requesting user's profile information (e.g., interests, criteria, location). For example, based on how the requesting user has voted on the profiles that have been already been displayed on the user interface, the system (e.g., the matching engine 142) dynamically readjusts the sequence of profiles (e.g., changes the ranking of the profiles), either during the current user session or for the next user session.

In some implementations, which profiles are included in the sequence of profiles for a requesting user are dynamically adjusted based on factors such as a change in the requesting user's profile information (e.g., interests, criteria, location among other factors) or the user's voting patterns. For example, when requesting user changes his location, the system 100 (e.g., the matching engine 142) reapplies matching criteria to the profile of the requesting user, identifies a new set of potential matches, and adds the profiles for those potential matches to the sequence of profiles to be presented to the requesting user, e.g., in his next browsing session. In detecting change in the requesting user's profile information and reapplying matching criteria, the system 100 utilizes the database 146 in accessing records associated with the requesting user.

In some implementations, the sequence of profiles for a requesting user is dynamically adjusted based on a user review attribute for each of one or more profiles presented to the requesting. In some implementations, the sequence of profiles is dynamically adjusted during a browsing session. In some implementations, the sequence of profiles is dynamically adjusted for a subsequent browsing session (e.g., the next time the user logs on, the sequence of profiles is adjusted). The dynamic adjustment can include an adjustment of the order of the profiles in the sequence, an adjustment of which profiles are included in the sequence, or both.

The user review attribute is indicative of the requesting user's interaction with the user interface during display of information representative of a profile associated with a user of the social network. The user review attribute for a given presented profile is based on factors such as time the requesting user spent interacting with the presented profile (e.g., viewing the profile, voting on the profile, holding a pointer over the profile, etc.)), movement of the pointer (e.g., how quickly the pointer moved over the profile, how long the pointer lingered on particular features of the profile, location of the pointer when lingering or when a selection or vote is made), selection parameters (e.g., fast double clicks, a slow single click), or other attributes related to the requesting user's interaction with the presented profile (e.g., viewing, tapping, swiping, dragging, or selecting one or more user selectable elements on the user interface).

In some implementations, the user review attribute for a given presented profile is based on a machine learning-guided interest classifier that processes data associated with the user's interaction with or behavior while viewing the presented profile, e.g., eye movement facial reaction, physiology (e.g., heart rate), or other interaction or behavior, e.g., obtained by components of the client device, such as a camera or heart rate sensor. Based on these data, the machine learning-guided interest classifier infers the user's interest in the presented profile. In one example, an elevated heart rate (e.g., above the user's baseline heart rate, averaged across a specified time period) while looking at a presented profile can indicate the user's excitement towards the presented profile. In another example, the user's eyebrow lift can indicate that the user reacted positively towards the presented profile. In some examples, the user's interest can be assigned a value from among a set of available values, e.g., "super excited," "excited," "indifferent," and "not interested," which value is incorporated into the determination of the user review attribute for the presented profile. The user can be asked to grant permission to participate in this behavioral interest classifier approach to inferring interest.

In some examples, The machine learning-guided interest classifier is trained (e.g., on data obtained with multiple users) to infer the user's interest given a particular set of data (e.g., facial expressions, eye movements, or physiological data). Based on the performance of the accuracy of the interest classifier, the interest classifier can be retrained with additional data.

The user review attribute for a presented profile is indicative of the requesting user's interest in the presented profile. As such, the user review attribute is usable by the system (e.g., the matching engine 142) in learning the requesting user's preferences (e.g., what the requesting user is looking for in a profile). In some implementations, the system can identify additional profiles to be included in the sequence of profiles, or remove profiles from the sequence of profiles, based on the user review attribute for each of multiple previously presented profiles. For example, if the user review attribute indicates that the requesting user tends to linger longer on and smiles more often at profiles of users living in Boston, the profiles of other users living in Boston can be added to the sequence of profiles. In this example, the user review attribute takes into account both the pointer movement of the user and the user's facial reaction. Conversely, if the user review attribute indicates that the requesting user scrolls quickly through profiles of users who have pets, other profiles of pet owners can be removed from the sequence of profiles. In this way, over time, the frequency with which profiles of interest to the requesting user are presented to the requesting user is increased as the system learns the requesting user's preferences.

In some implementations, the system uses the user review attribute to adjust the order of the profiles in the sequence of profiles. For example, the system can adjust the order of the profiles such that profiles similar to profiles in which the requesting user had previously indicated interest are advanced in the sequence for earlier presentation to the requesting user. Conversely, profiles similar to profiles in which the requesting user displayed little interest are moved back in the sequence for later presentation to the requesting user.

In some implementations, the user review attribute can be assigned one of a set of discrete values. For instance, the user review attribute for a given presented profile can be assigned a value of "1" if one or more factors indicative of the requesting user's interaction with the presented profile exceeds a threshold, and a value of "0" otherwise. In an example, the user review attribute is assigned a value of '1' if the requesting user spent more than a threshold amount of time interacting with the presented profile (e.g., more than 2 minutes), and "0" if the requesting user spent less than the threshold amount of time interacting with the presented profile. The threshold amount of time can be adjusted by the system, by the requesting user, or both, or can be a default setting. In some implementations, the predefined threshold is determined by a machine learning method trained on identifying an optimal threshold that distinguishes profiles the user is likely interested in based on the user review attribute.

In some examples, various factors that contribute to the user review attribute can have different weights. For instance, when the requesting user votes "yes" on a presented profile, that interaction is weighted more highly as an indication of interest than when the requesting user lingers on a profile for longer than the threshold amount of time but then votes "no" on that profile.

The system 100 (e.g., the matching feed 400 and/or the panoramic feed 500) can determine a mutual vote between two users and establishes a one-to-one communication between two users who have been matched. As described above, when the requesting user votes 'yes' on a profile for a particular user, the system adds the requesting user's profile to a sequence of profiles to be presented to the other user and/or otherwise enables the other user to vote on the requesting user. When the other user also votes 'yes' on the requesting user, a match is established between the two users.

Figure 6A:
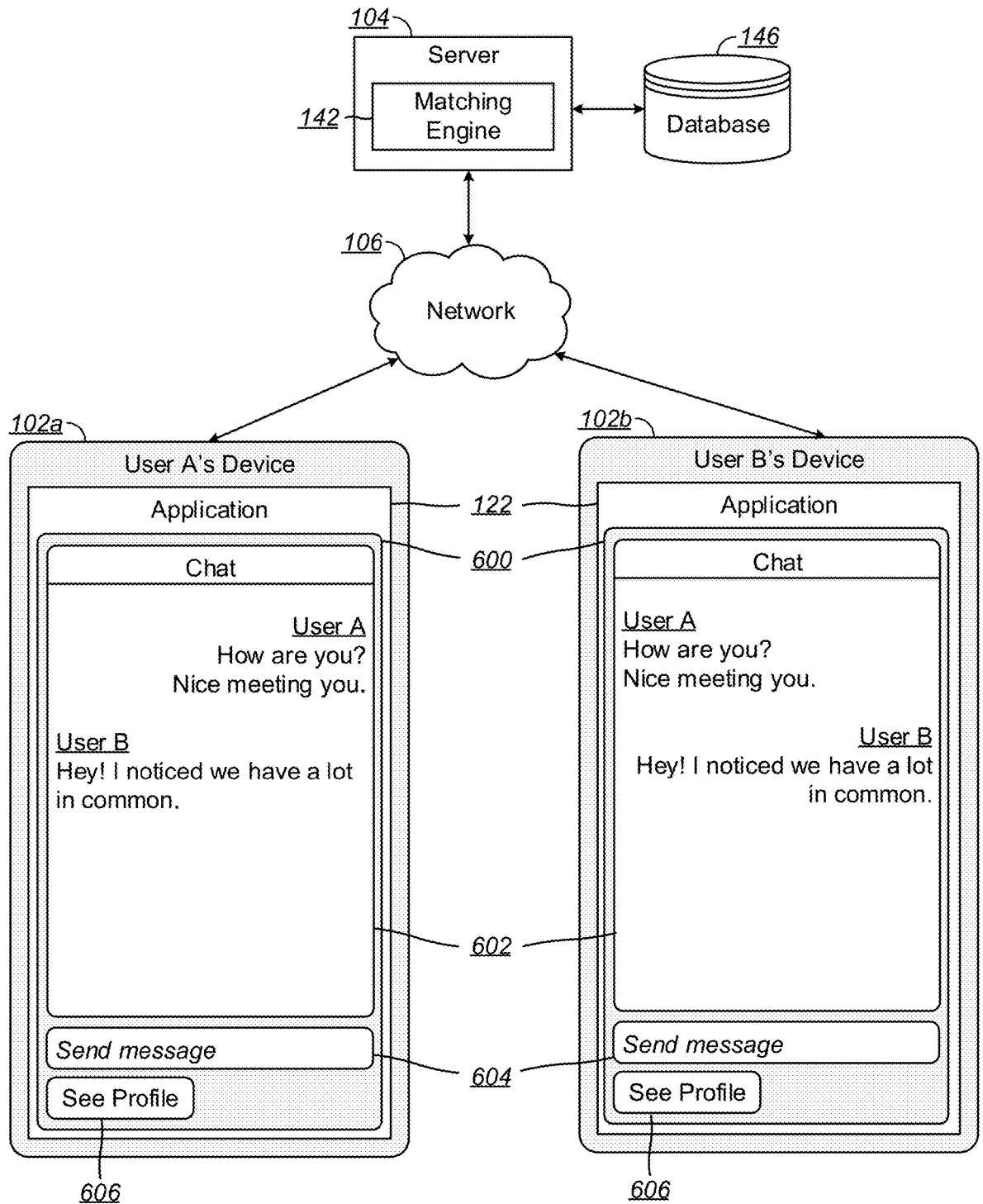
FIGS. 6A-6B illustrate an example user interface.

FIG. 6A illustrates an example one-to-one communication interface 600 that allows two matched users, e.g., User A using a client device 102a and User B using a client device 102b, to communicate with each other. In this example, User A and User B have been matched (e.g., both voting 'yes' to each other's profile information) by the social network application 122. In some implementations, the system 100 enables the one-to-one communication interface 600 immediately after identifying a new match. In some implementations, the system 100 supplies a notification, e.g., in a form of a pop-up window, that the requesting user has been matched.

The one-to-one communication interface 600 can be a combination of one or more of message, audio, and video data. In the example of FIG. 6A, the one-to-one live communication interface 600 includes message data via a chat window 602 where the matched users can send messages using a send message box 604.

Figure 6B:
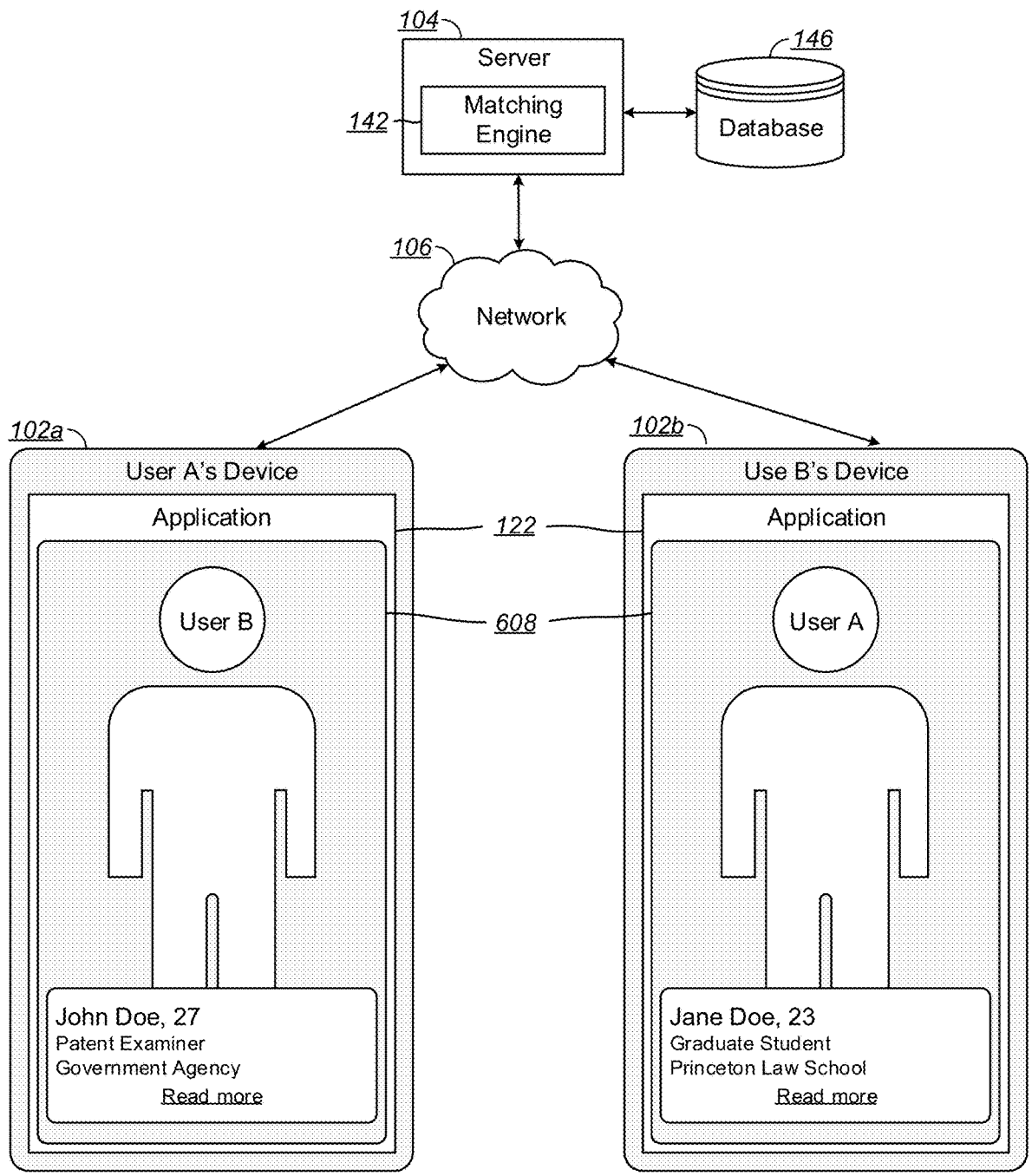

The one-to-one communication interface 600 can provide a feature that allows matched users to see each other's profile via a profile selectable element 606. Referring to FIG. 6B, the application 122 can present the matched user's profile information through the user interface 608, in response to the user's selection of the profile selectable element 606. In some implementations, in response to the user's selection of the other user's name in the chat window 602 as shown in FIG. 6A, the application 122 can present the matched user's profile information through the user interface 608 as shown in FIG. 6B. As described above, the user interface 608 can include profile information, such as name, age, biographical text, photographs, and a range of other fields.

The one-to-one communication interface 600 allows a user to express his or her reactions. For example, in response to a first user's live communication, a second user may react with one or more of emojis, pictures, and videos. In some implementations, users in the one-to-one communication interface 600 may apply a visual filter to his or her image data, e.g., applying a sticker to his or her face or blurring a background.

In some implementations, the one-to-one communication interface 600 is between the requesting user and a group that includes two or more users. Features applicable to the one-to-one communication interface 600 between two users are equally applicable to a user being matched with a group.

Figure 7:
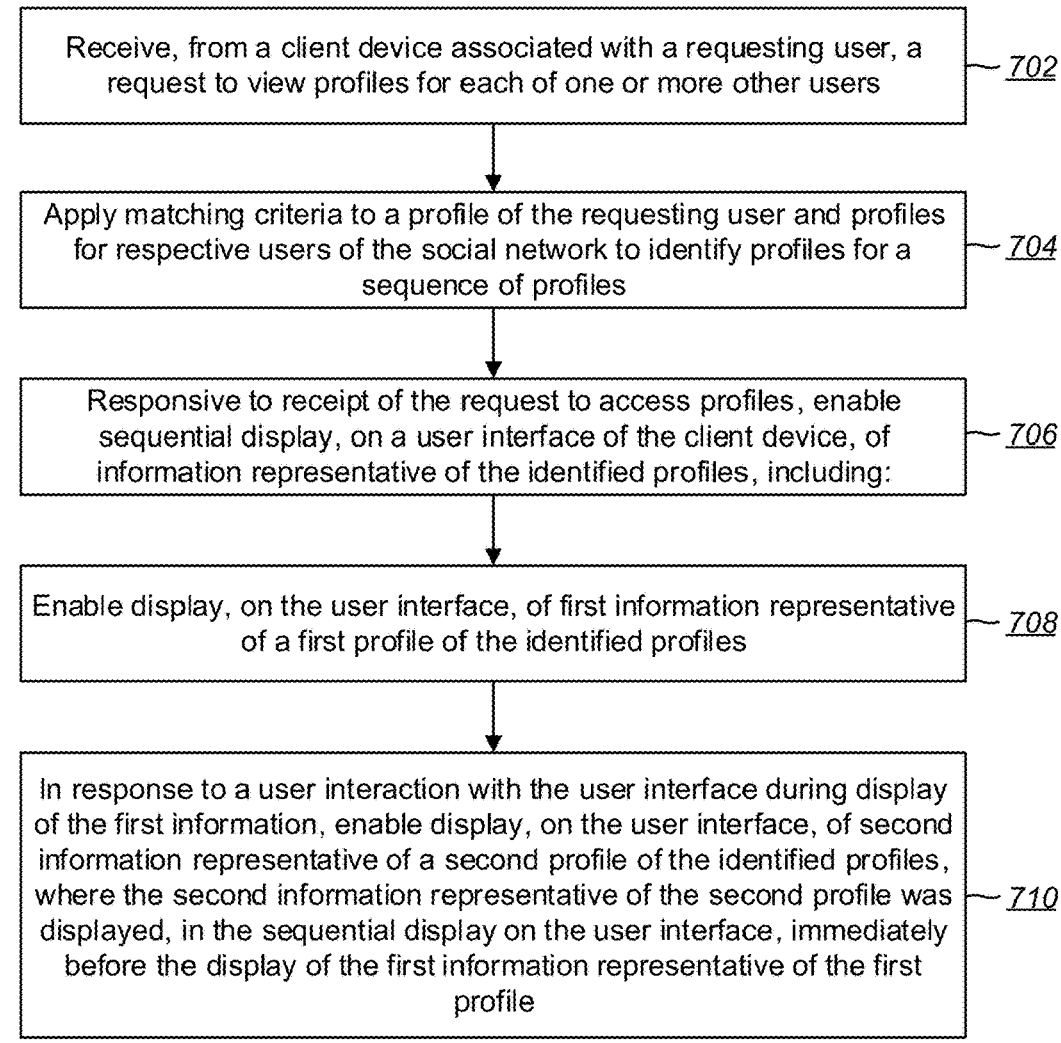
FIGS. 7 and 8 are flowcharts of example processes.
Like reference numbers and designations in the various drawings indicate like elements.

FIG. 7 is a flowchart of an example process 700 for presenting user profiles on a user interface. The process is described as being performed by a system of one or more computers programmed appropriately in accordance with this specification. For example, the matching engine 142 from the system 100 of FIG. 1 can perform at least a portion of the example process. In some implementations, various steps of a method of providing a live streaming based discovery channel can be run in parallel, in combination, in loops, or in any order.

The live streaming based discovery channel refers to a live communication each user of the social media application can initiate. For example, a first user can join a second user's live communication, and they can interact with each other, e.g., sending messages and voting to match. In some implementations, multiple users join a particular user's live communication, where the multiple users view the live communication and participate, e.g., sending messages, reactions, and votes to match with the particular user.

A request to view profiles for each of one or more other users is received from a client device associated with a requesting user (702). The requesting user and the other users are users of a social network, e.g., the application 122. As described above referring FIG. 4A, the requesting user can request to view profiles of one or more other users by interacting with a view settings interface. In some implementations, the requesting user requests to view multiple profiles concurrently.

Matching criteria are applied to a profile of the requesting user and profiles for respective users of the social network to identify profiles for a sequence of profiles (704). The sequence of profiles include the profiles of the identified potential matches, e.g., ordered according to their ranking. Factors, such as interests, location, age, or other factors, can be used in identifying the profiles and in determining the sequence of profiles. In some implementations, the sequence of profiles for the identified profiles is in a predefined order. The predefined order for the sequence of profiles can be determined, e.g., based on a similarity between each profile and the profile of the requesting user.

In some implementations, the sequence of profiles is dynamically determined based on the user interaction with the user interface during display of information representative of each of one or more profiles. The user interaction with the user interface includes a user interaction, such as tapping, swiping, dragging, or selection, with a user selectable element in the user interface.

Responsive to receipt of the request to access profiles, information representative of the identified profiles is displayed sequentially (706).

Specifically, first information representative of a first profile of the identified profiles is displayed (708). The first profile is associated with a first user of the social network. For the case of the panoramic feed, information representative of a first set of multiple profiles is displayed, where each profile of the first set of multiple profiles is associated with a corresponding user of the first set of multiple users of the social network.

Response to a user interaction with the user interface during display of the first information, second information representative of a second profile in the sequence is displayed (710). The second profile is associated with a second user of the social network, and the second profile is the preceding profile in the sequence of profiles before the first profile. The second information representative of the second profile was displayed, in the sequential display on the user interface, immediately before the display of the first information representative of the first profile.

For the case of the panoramic feed, information representative of a second set of multiple profiles is displayed, where the second set of multiple profiles is associated with a second set of multiple users of the social network; at least some of the second information representative of the second set of multiple profiles was displayed, in the sequential display on the user interface, immediately before the display of the first information representative of the first set of multiple profiles.

In some implementations, the system enables display, on the user interface, of a live streaming based discovery channel. In some implementations, the system enables display of the live streaming based discovery channel in parallel, in combination, or in loops with the enabling display of the first information representative of the first profile or the second information representative of the second profile. For example, the user interface can include the live streaming based discovery channel next to the profile information. That is, a user may join a live communication or continue to swipe across profiles (e.g., one profile at a time, or select a profile from the panoramic feed). In some implementations, the system receives a user preference on which screen, e.g., live streams or profiles, the user would like to see. In response to receiving a request to view the live streaming based discovery channel, the system enables display of available live streamings on the user interface. For example, similar to the panoramic feed, a plurality of live streamings is displayed; a user can select a particular live streaming to join. In some implementations, the system enables display of one live streaming at a time, and a user can interact with the user interface, e.g., by swiping in a particular direction or touching a screen, to join a particular live streaming. The user can move both forwards and backwards to see the previous live streaming or a profile of a user associated with the previous live streaming.

In some implementations, for the requesting user, the system enables the live streaming of the matched users. In this case, the requesting user can navigate through live streamings on the user interface and interact with the matched users by exchanging messages. In some implementations, both the requesting user and the user broadcasting the live streaming can live stream, e.g., the broadcasting user may grant a permission, to the requesting user, to live stream or join the broadcasting user's live stream.

In some implementations, a vote is received from the requesting user to match with the second user associated with the second profile. Responsive to receipt of the vote, the profile of the requesting user is added to a second sequence of profiles to be displayed to the second user. For the case of the panoramic feed, a vote for a particular one of the multiple profiles that are displayed on the user interface is received.

In some implementations, a vote is received not to match with the second user associated with the second profile and the second profile associated with the second user is removed from the sequence of profiles. For the case of the panoramic feed, a vote not to match with a particular one of the multiple profiles that are displayed on the user interface is received.

Figure 8:
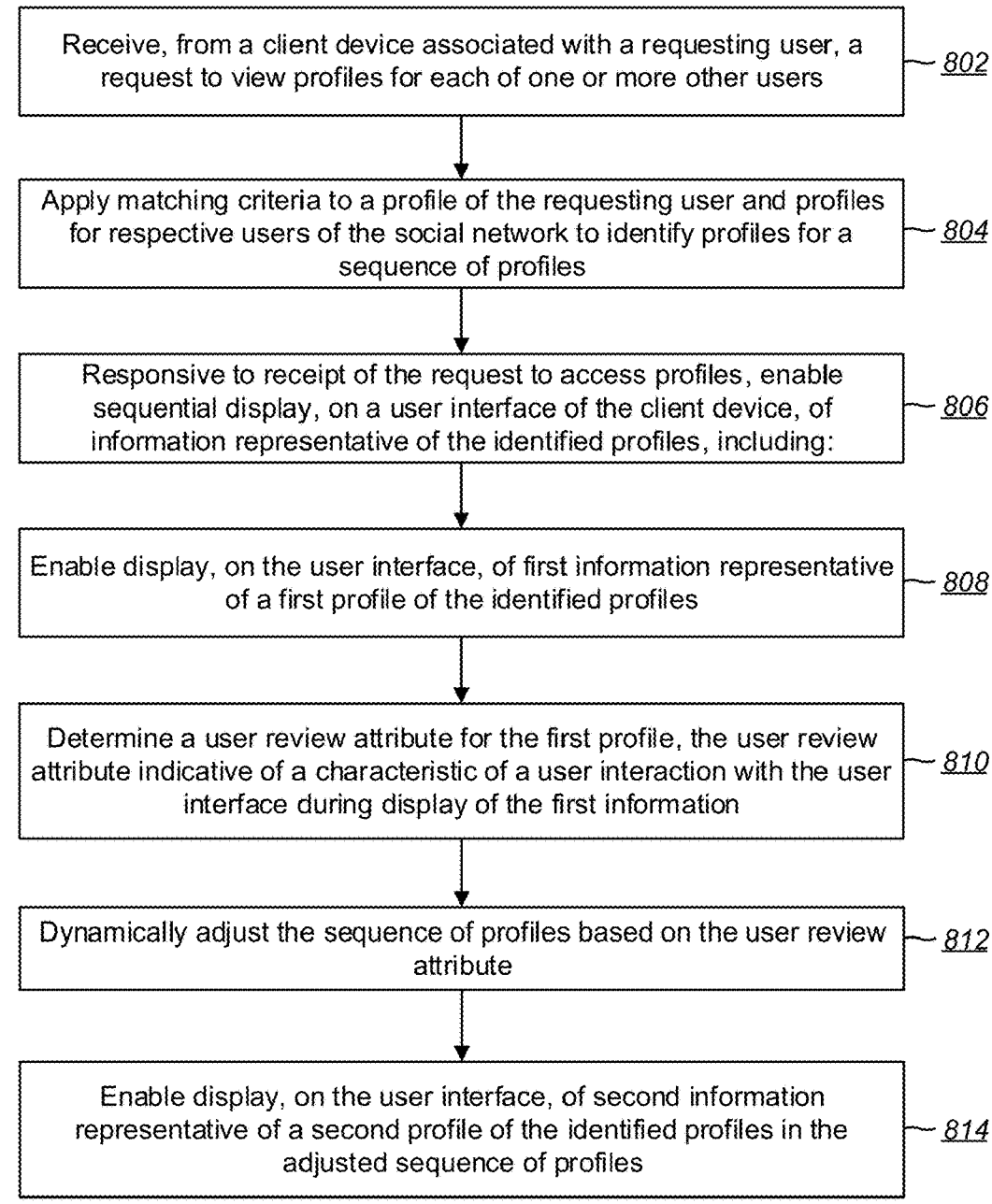

FIG. 8 is a flowchart of an example process 800 for presenting user profiles on a user interface. The process is described as being performed by a system of one or more computers programmed appropriately in accordance with this specification. For example, the matching engine 142 from the system 100 of FIG. 1 can perform at least a portion of the example process. In some implementations, various steps of a method of providing a live streaming based discovery channel can be run in parallel, in combination, in loops, or in any order.

Elements 802, 804, 806, and 808 are consistent with elements 702, 704, 706, and 708 as described above.

A user review attribute for the first profile is determined (810). The user review attribute is indicative of the requesting user's interaction with the user interface during display of the first information.

The sequence of profiles is dynamically adjusted based on the user review attribute (812). In some implementations, one or more displayed profiles for which the user review attribute exceeds a predefined threshold are identified. One or more similar profiles to the displayed profiles for which the user review attribute exceeds a predefined threshold are identified. The sequence of profiles is adjusted such that the one or more similar profiles are prioritized (e.g., added to the sequence of profiles or advanced in the sequence of profiles). In some implementation, the sequence of profiles is adjusted in the current browsing session. In some implementation, the sequence of profiles is adjusted for a subsequent browsing session.

Second information representative of a second profile of the identified profiles in the adjusted sequence of profiles is displayed on the user interface (814). The second profile is associated with a second user of the social network, and the second profile is the next profile in the adjusted sequence of profiles after the first profile.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method comprising:
receiving, from a client device associated with a requesting user, a request to view profiles for each of one or more other users, wherein the requesting user and the other users are users of a social network;
applying matching criteria to a profile of the requesting user and profiles for each of the one or more other users of the social network to identify a sequence of profiles; and
responsive to receipt of the request to view the profiles, enabling sequential display, on a user interface of the client device, of information representative of the sequence of profiles, comprising:
enabling display, on the user interface, of first information representative of a first profile of the sequence of profiles, wherein the first profile is associated with a first user of the social network;
in response to a user interaction with the user interface during display of the first information, enabling display, on the user interface, of second information representative of a second profile of the sequence of profiles, wherein the second profile is associated with a second user of the social network, wherein the second information representative of the second profile was displayed, in the sequential display on the user interface, immediately before the display of the first information representative of the first profile;
determining, by a machine learning model, a user review attribute for each profile displayed on the user interface, the user review attribute for a corresponding profile (i) determined by processing user features associated with the user interaction for the corresponding profile and (ii) represents an amount of time the requesting user interacts with a corresponding profile or movement of a pointer when the corresponding profile is displayed; and
dynamically adjusting the sequence of profiles according to the determined user review attribute for each profile that is displayed.

2. The method of claim 1, comprising:
in response to the user interaction with the user interface during display of the second information representative of the second profile, enabling, on the user interface, display of the first information representative of the first profile of the sequence of profiles, wherein the first information representative of the first profile has not previously been displayed on the user interface during a predetermined period of time.

3. The method of claim 1, wherein the sequence of profiles is in a predefined order.

4. The method of claim 3, comprising:
determining the predefined order for the sequence of profiles.

5. The method of claim 4, wherein determining the predefined order for the sequence of profiles comprises ordering the profiles based on a similarity between each profile and the profile of the requesting user.

6. The method of claim 1, wherein the second profile is a preceding profile in the sequence of profiles before the first profile.

7. The method of claim 1, further comprising:
determining, based on the user review attribute, (i) profiles to be included in the sequence of profiles or (ii) an order of the profiles included in the sequence of profiles.

8. The method of claim 7, wherein the user review attribute for a corresponding profile is based on eye movement of the requesting user, a facial expression of the requesting user, or a physiological reaction of the requesting user when the corresponding profile is displayed.

9. The method of claim 7, comprising:
identifying one or more displayed profiles for which the user review attribute exceeds a predefined threshold;
identifying one or more similar profiles to the one or more displayed profiles for which the user review attribute exceeds the predefined threshold; and
adjusting the sequence of profiles (i) to include the one or more identified similar profiles or (ii) to advance the one or more identified similar profiles in the sequence of profiles.

10. The method of claim 1, wherein the user interaction with the user interface comprises a user interaction with a user selectable element in the user interface.

11. The method of claim 10, wherein the user interaction with the user selectable element in the user interface comprises one or more of tapping, swiping, dragging, or selecting the user selectable element.

12. The method of claim 1, comprising:
receiving, from the requesting user, a vote to match with the second user associated with the second profile.

13. The method of claim 12, comprising:
responsive to receiving the vote, adding the profile of the requesting user to a second sequence of profiles to be displayed to the second user.

14. The method of claim 1, comprising:
receiving, through the user interface, a vote not to match with the second user associated with the second profile; and
removing the second profile associated with the second user from the sequence of profiles.

15. The method of claim 1:
wherein receiving the request to view the profiles comprises receiving the request to view multiple profiles concurrently; and
wherein
enabling display, on the user interface, of the first information includes enabling display of information representative of a first set of multiple profiles, wherein each profile of the first set of multiple profiles is associated with a corresponding user of the first set of multiple users of the social network; and
wherein enabling display, on the user interface, of the second information includes enabling display of information representative of a second set of multiple profiles, wherein the second set of multiple profiles is associated with a second set of multiple users of the social network, wherein at least some of the second information representative of the second set of multiple profiles was displayed, in the sequential display on the user interface, immediately before the display of the first information representative of the first set of multiple profiles.

16. The method of claim 15, comprising:
receiving a vote for a particular one of the multiple profiles that are displayed on the user interface.

17. The method of claim 1, further comprising:
enabling display, on the user interface, of a live streaming based discovery channel.

18. The method of claim 17, wherein enabling display of the live streaming based discovery channel comprises:
enabling display of the live streaming based discovery channel in parallel, in combination, or in loops with the enabling display of the first information representative of the first profile or the second information representative of the second profile.

19. One or more non-transitory computer-readable media storing software comprising instructions that are operable, when executed by one or more computers, to cause the one or more computers to perform operations comprising:
receiving, from a client device associated with a requesting user, a request to view profiles for each of one or more other users, wherein the requesting user and the other users are users of a social network;
applying matching criteria to a profile of the requesting user and profiles for each of the one or more other users of the social network to identify a sequence of profiles; and
responsive to receipt of the request to view the profiles, enabling sequential display, on a user interface of the client device, of information representative of the sequence of profiles, comprising:
enabling display, on the user interface, of first information representative of a first profile of the sequence of profiles, wherein the first profile is associated with a first user of the social network;
in response to a user interaction with the user interface during display of the first information, enabling display, on the user interface, of second information representative of a second profile of the sequence of profiles, wherein the second profile is associated with a second user of the social network, wherein the second information representative of the second profile was displayed, in the sequential display on the user interface, immediately before the display of the first information representative of the first profile;
determining, by a machine learning model, a user review attribute for each profile displayed on the user interface, the user review attribute for a corresponding profile (i) determined by processing user features associated with the user interaction for the corresponding profile and (ii) represents an amount of time the requesting user interacts with a corresponding profile or movement of a pointer when the corresponding profile is displayed; and
dynamically adjusting the sequence of profiles according to the determined user review attribute for each profile that is displayed.

20. A system comprising:
one or more computers and one or more storage devices storing instructions that are operable, when executed by the one or more computers, to cause the one or more computers to perform operations of:
receiving, from a client device associated with a requesting user, a request to view profiles for each of one or more other users, wherein the requesting user and the other users are users of a social network;
applying matching criteria to a profile of the requesting user and profiles for each of the one or more other users of the social network to identify a sequence of profiles; and
responsive to receipt of the request to view the profiles, enabling sequential display, on a user interface of the client device, of information representative of the sequence of profiles, comprising:
enabling display, on the user interface, of first information representative of a first profile of the sequence of profiles, wherein the first profile is associated with a first user of the social network;
in response to a user interaction with the user interface during display of the first information, enabling display, on the user interface, of second information representative of a second profile of the sequence of profiles, wherein the second profile is associated with a second user of the social network, wherein the second information representative of the second profile was displayed, in the sequential display on the user interface, immediately before the display of the first information representative of the first profile;
determining, by a machine learning model, a user review attribute for each profile displayed on the user interface, the user review attribute for a corresponding profile (i) determined by processing user features associated with the user interaction for the corresponding profile and (ii) represents an amount of time the requesting user interacts with a corresponding profile or movement of a pointer when the corresponding profile is displayed; and
dynamically adjusting the sequence of profiles according to the determined user review attribute for each profile that is displayed.

* * * * *